(12) United States Patent
Lerner

(10) Patent No.: US 9,946,687 B2
(45) Date of Patent: Apr. 17, 2018

(54) FIXED-POINT HIGH DYNAMIC RANGE FAST FOURIER TRANSFORMS

(71) Applicant: ANALOG DEVICES, INC., Norwood, MA (US)

(72) Inventor: Boris Lerner, Sharon, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 94 days.

(21) Appl. No.: 15/008,984

(22) Filed: Jan. 28, 2016

(65) Prior Publication Data

US 2017/0220522 A1    Aug. 3, 2017

(51) Int. Cl.
G06F 17/14    (2006.01)

(52) U.S. Cl.
CPC .................. *G06F 17/142* (2013.01)

(58) Field of Classification Search
CPC .......................................... G06F 17/14–17/142
USPC .................. 708/404–405, 408–409
See application file for complete search history.

(56) References Cited

U.S. PATENT DOCUMENTS

| 6,137,839 | A | 10/2000 | Mannering et al. |
| 7,088,791 | B2 | 8/2006 | Magee |
| 7,197,525 | B2 | 3/2007 | Stein et al. |
| 2004/0111227 | A1* | 6/2004 | Stein ............ G06F 17/142 702/77 |
| 2004/0143616 | A1 | 7/2004 | Kang |
| 2005/0243938 | A1 | 11/2005 | Armstrong et al. |
| 2009/0268603 | A1 | 10/2009 | Sampath et al. |
| 2017/0097405 | A1* | 4/2017 | Lerner ............ G01S 7/352 |

OTHER PUBLICATIONS

David Elam and Cesar Iovescu, "A Block Floating Point Implementation for an N-Point FFT on the TMS320C55x DSP", Texas Instruments Application Report SPRA948, Sep. 2003.*
Altera Corporation, "FFT/IFFT Block Floating Point Scaling", Altera Application Note 404, Oct. 2005.*
International Search Report and Written Opinion issued in PCT Patent Application Serial No. PCT/US17/15634 dated May 16, 2017.

(Continued)

*Primary Examiner* — Matthew Sandifer
(74) *Attorney, Agent, or Firm* — Patent Capital Group

(57) ABSTRACT

A method for generating a Fast Fourier Transform (FFT) is disclosed. The method includes providing an input signal to two or more fixed-point FFT algorithms that apply different scaling to reduce growth of their output, resulting in each of the FFT algorithms yielding an array of FFT output values characterized by a different gain. The method further includes determining, on a per-FFT output value basis, whether an output value of an FFT algorithm with a relatively high gain was clipped due to saturation. If not, then the output value of that FFT algorithm is included in the final FFT. Otherwise, an output value of an FFT algorithm with a lower gain is included in the final FFT. Reconstructing the final FFT by such combination of values from different FFTs allows benefiting from the advantages of both higher- and lower-gain FFTs while avoiding or minimizing their disadvantages.

42 Claims, 13 Drawing Sheets

(56) References Cited

OTHER PUBLICATIONS

P. Kobal et al., *Performance of Fixed-Point FFTs: Rounding and Scaling Considerations*, Proc. IEEE Int. Conf. Acoustics, Speech, Signal Processing (Tokyo), Apr. 1986, 4 pages, [obtained from the internet: https://www.semanticscholar.org/paper/Performance-of-Fixed-point-Fft-s-Rounding-and-Scal-Kabal-Sayar/ 4a7af123f8c269ef9b473f03b95b31cbd1e4b1a9].

*The Fundamentals of FFT-Based Signal Analysis and Measurement in LabVIEW and LabWindows/CVI*, Published Jun. 8, 2009, www.ni.com, 16 pages.

Sthanunathan Ramakrishnan et al., *Exploiting Signal and Noise Statistics for Fixed Point FFT Design Optimization in OFDM Systems*, IEEE, Jan. 29-31, 2010, 5 pages.

*Application Note, Freescale Semiconductor*, Document No. AN2114, Rev. 4, Apr. 2013, © 2004-2013 Freescale Semiconductor, Inc., 21 pages.

P. Kobal et al., *Rounding and Scaling in Fixed-Point FFT Implementations*, INRS-Telecommunications, Ile de Soeurs, Que, Canada, Jun. 12, 1985, 48 pages.

\* cited by examiner

FIXED-POINT HIGH DYNAMIC RANGE FAST FOURIER TRANSFORMS

TECHNICAL FIELD OF THE DISCLOSURE

The present disclosure generally relates to digital-signal processing and, more particularly, to algorithms for computing fixed-point Fast Fourier Transforms.

BACKGROUND

A receiver is an electronic device that receives signals in the form of e.g. electromagnetic waves (in case of an electromagnetic receiver) or acoustic waves (in case of an acoustic receiver) and converts the received signals into electrical signals, which are then analyzed to extract information carried by the received signals. Behavior of signals can be analyzed in the time domain (e.g., how the signal amplitude varies over time) as well as the frequency domain (i.e., the different frequency components that make up the signal), where the Fourier transform mathematically relates these two domains. In addition, a signal can be analyzed as a continuous waveform or, in digital-signal processing (DSP) applications, as a large set of time-domain points. Fast Fourier Transforms (FFTs) refer to algorithms for calculating discrete Fourier transforms (DFTs), as well as their inverses (IDFTs), of signals represented in digital form.

Because of the ubiquitous use of Fourier transforms across signal-processing applications, efforts have been made to improve its execution computationally—hence the many FFT approaches, such as e.g. decimation in time, decimation in frequency, radix-2, radix-4, mixed radix, etc. Still, further improvements in implementing FFTs are desired.

OVERVIEW

Embodiments of the present disclosure provide mechanisms for computing fixed-point FFTs. These methods may be particularly advantageous for applications in radar and sonar receivers where FFTs may be used to determine distances to, locations of, or velocities of objects. However, these methods are not limited to such applications and, in fact, may be used in any applications where fixed-point FFTs are used, such as e.g. aviation, telecommunications, acoustic source localization and separation, etc.

According to one aspect of the present disclosure, a computer-implemented method for generating an FFT of an input signal is disclosed. The method includes applying a first multi-stage FFT algorithm to the input signal to generate a first FFT comprising N first values Output1[n] indexed with an index n and applying a second multi-stage FFT algorithm to the input signal to generate a second FFT comprising N second values Output2[n] indexed in the same manner as the first values. The first FFT algorithm is configured to scale an output of one or more stages of the first FFT algorithm so that a gain of the first FFT algorithm is K, while the second FFT algorithm is configured to scale an output of one or more stages of the second FFT algorithm so that a gain of the second FFT algorithm is L, where L is smaller than K. Scaling is typically used to limit the growth of the outputs of the multiple stages of a fixed-point FFT in order to avoid saturation of the FFT outputs. The method further includes generating the FFT by reconstructing the FFT comprising N FFT values Output[n] indexed with the index n based on the first values and the second values. The reconstruction is performed, by, for each index n, determining whether comparison of the first value Output1[n] and the second value Output2[n] satisfies a predefined condition that, when satisfied, confirms/indicates that the output value [n] of the first FFT, first value Output1[n], is not saturated, and then, upon positive determination (i.e., when it is determined that the output value [n] of the first FFT is not clipped due to saturation), including the first value Output1[n] as the FFT value Output[n], and, upon negative determination (i.e., when it is determined that the output value [n] of the first FFT was clipped due to saturation), including a value that is based on, e.g. proportional to or equal to, the second value Output2[n] as the FFT value Output[n]. Since the FFT output is computed by performing a reconstruction using the outputs of the first and second FFT algorithms, this approach is referred to herein as a reconstruction method/algorithm, and the N values FFT values Output[n] are referred to as reconstruction values.

In some embodiments, the first FFT algorithm is an FFT algorithm comprising two or more butterfly stages, where scaling the output of one or more stages of the first FFT algorithm comprises scaling an output of every pair of butterfly stages by a scaling factor equal to two times of the inverse of a growth factor for the pair of butterfly stages for the first FFT algorithm for a complex exponential input signal. When used with radar or sonar receivers, such scaling may allow achieving a balance, for any type of input signals that could be handled by radar or sonar receivers, between having a signal to noise ratio (SNR) value that is possible to obtain for a particular input signal and an SNR value that is needed to successfully process that input signal.

In the present description of example embodiments, scaling is sometimes described with reference to multiplication of an output of one or more FFT butterfly stages with a certain scaling factor. However, a person of ordinary skill in the art would readily recognize that multiplication is just one non-limiting example because substantially the same scaling may be achieved by other means, such as e.g. by shifting or by dividing by a scaling factor that is the inverse of the factor used in scaling by multiplication. Therefore, all of the possible implementations of scaling that effectively carry out scaling by multiplication by scaling factor(s) as described herein, and all of the possible implementations of scaling that effectively reduce the output of the FFT output stage being scaled, are within the scope of the present disclosure.

One aspect of the present disclosure provides a system that includes at least a receiver and a data processing system configured to carry out FFT reconstruction methods described herein.

In some aspects of the present disclosure, the system may be a radar or a sonar system, used e.g. in automotive applications or in aviation. The system may further include a radar or a sonar transmitter. A radar transmitter is configured to transmit a radio signal which could comprise a frequency ramp, while the sonar transmitter is configured to transmit an acoustic signal which could comprise a frequency ramp. The radar receiver is configured to detect a radio signal including at least a portion of the transmitted radio signal reflected from an object and to generate an input signal for the data processing system based on the detected radio signal. The sonar receiver is configured to detect a sonar signal including at least a portion of the transmitted sonar signal reflected from an object and to generate an input signal for the data processing system based on the detected sonar signal. In both systems, the data processing system is configured to provide the input signal as an input to an FFT reconstruction algorithm, and determine one or more of an indication of a distance to the object, an indication of a velocity of the object, and an indication of a location of the object based on an output of the FFT reconstruction algorithm.

Another aspect of the present disclosure provides a system for extracting a baseband signal of interest using an FFT reconstruction algorithm. The system includes at least a data processing system configured to receive an input signal and perform the FFT reconstruction algorithm as described herein, where the input signal includes either a radio signal detected by one or more radio antennas or a sonar signal detected by one or more sonar sensors. The data processing system is further configured extract the baseband signal based on the output of the FFT reconstruction algorithm.

According to other aspects of the present disclosure, a system that includes at least a receiver and a data processing system configured to carry out FFT reconstruction methods described herein may be a telecommunications system, e.g. used for Orthogonal Frequency Division Multiplexing, a system used for audio source localization and separation, i.e. a system used to determine or estimate spatial positions (acoustic source localization) of various acoustic sources that may provide acoustic contributions to the environment and/or to differentiate between contributions of one or more acoustic sources to the acoustic environment (acoustic source separation), or any other system that receives incoming signals and performs FFT on the received signals in order to make conclusions about the environment.

As will be appreciated by one skilled in the art, aspects of the present disclosure, in particular the FFT reconstruction methods described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing receivers or/and their controllers, etc.) or be stored upon manufacturing of these devices and systems.

Other features and advantages of the disclosure are apparent from the following description, and from the claims.

DESCRIPTION OF EXAMPLE EMBODIMENTS OF THE DISCLOSURE

Figure 1A:
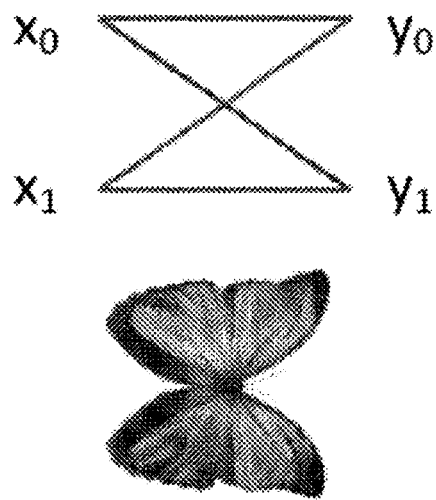
FIGS. 1A and 1B illustrate exemplary butterfly operations.

FFT Basics and Examples of Using FFTs in Radar and Sonar Applications

As previously described herein, FFTs refer to algorithms for computing discrete Fourier transforms and inverse discrete Fourier transforms of signals represented in digital form.

An FFT is an example of a transformation function that may be applied to acquired signals, thereby transforming the acquired signals (which may possibly be processed prior to the transformation, e.g. by multiplying the acquired waveform with a window function) from a time domain to a frequency domain. As a result, a frequency decomposition of a portion of the acquired signal is obtained. An example that illustrates the use of FFTs in analyzing acquired signals is provided below in context of e.g. radar (i.e. electromagnetic) or sonar signals. However, FFT reconstruction techniques described herein are equally applicable to any other FFTs used in any other settings and any other types of received signals, such as e.g. to FFTs used in telecommunications or FFTs used in acoustic source localization and separation.

Radar and sonar systems typically function as follows. First, a radar/sonar transmitter outputs a signal, an echo of which will be evaluated to locate an object. Often times a transmitter outputs a signal periodically. A signal transmitted by a transmitter is typically a chirp signal. As is well known, a chirp signal is a signal in which the frequency either increases or decreases with time, for former typically referred to as an "up-chirp" and the latter typically referred to as a "down-chirp." Other terms sometimes used interchangeably with the term "chirp" are "frequency ramp," "frequency sweep," or "sweep signal." In case of radar systems, the signals used are electromagnetic signals in the radio range. In case of sonar systems, the signals used are acoustic signals.

The transmitted signal is reflected from an object and the reflected, i.e. echoed, signal is acquired by a radar/sonar receiver, using appropriate sensors. In case of radar systems, appropriate sensors include at least one, but typically a plurality, of radio antennas. In case of sonar systems, appropriate sensors include at least one, but typically a plurality, of acoustic sensors.

A radar/sonar receiver converts the acquired reflected signal into an electrical input signal to be provided to a data processing unit of a radar/sonar system. The data processing unit then performs a series of operations on the input signal, which operations involve multiple applications of one or more FFT algorithms.

If a signal transmitted by a transmitter is a chirp signal, then the reflected signal is also a chirp signal. Since the object is at a certain distance away from the transmitter, the received chirp signal is phase shifted with respect to the transmitted chirp signal. The phase difference between the transmitted signal and the received reflected signal is directly proportional to how long it took the transmitted signal to reach the object and the reflected signal to come back, which, in turn, is proportional to the distance to the object. Thus, the phase difference is indicative of the distance to the object. Because transmitted signal is a chirp, the phase difference between the transmitted and the reflected chirps manifests itself as a phase difference in an FFT output resulting from applying FFT algorithms as described herein. Thus applying FFT algorithms to the received chirp signal allows estimating the distance to the object. In addition, applying FFT algorithms to the received chirp signal may also allow estimating other characteristics such as e.g. velocity of a moving object, direction of movement of an object, and/or location of an object with respect to the transmitter and/or the receiver.

One approach for processing detected radar signals using FFT algorithms is described below. However, other ways are also known to a person of ordinary skill in the art, all of which are within the scope of the present disclosure.

A radar receiver detects signals reflected from objects using a radar antenna and creates a rectangle of data where each row is a sequence of samples of the received signal, with the next row being the next sequence of samples, all sequences together constituting one ramp. Then horizontal (windowed) FFTs are performed on each row of samples. Then vertical windowed FFTs are performed on the results of the horizontal FFTs and signals reflected from the objects and detected by the radar receiver show up as "peaks" in the magnitude of the result of the vertical windowed FFTs. The result of a vertical windowed FFT for a particular input antenna of a radar receiver is typically arranged in a two-dimensional array where one dimension, typically the horizontal axis of the array, indexes frequencies and the other dimension, typically the vertical axis of the array, indexes velocities of the objects. When the transmitted signal is a chirp, a frequency component of a peak in such an array, i.e. the value of frequency at which the peak appears as indicated on the horizontal axis, acts as a time stamp by being indicative of the phase difference between the transmitted and the reflected chirps, which, as described above, is directly proportional to how far the object is. Thus, the horizontal axis of the array is commonly described as indexing distances, or ranges, to the objects.

Denoting frequencies with a variable f and denoting velocities with a variable v means that each element of the FFT array is indexed with certain pair of values (f, v), where a value of f (i.e., the horizontal location of the element in the array) indicates object's position and a value of v (i.e., the vertical location of the element within the array) indicates object's velocity. Each element of such an array comprises a value derived from the result of the application of the vertical FFT and representing a magnitude of the acquired signal for a given pair of values of frequency and velocity. Similar processing is done by sonar systems.

In applications other than radar and sonar applications, results of applying FFT algorithms may also be arranged in 2-dimensional arrays as described above, but instead of velocities other parameters of interest may be indexed, such as e.g. times. In general, results of applying FFT algorithms may be arranged in an array of any dimension, such as e.g. a one-dimensional array or a multi-dimensional array or tensor, indexed appropriately.

Each element of a computed FFT presented as an array of values is typically referred to as a "frequency bin" or simply a "bin," the term "bin" being indicative of the fact that such an array may be considered as comprising a plurality of bins into which the energy of the acquired signal(s) is distributed. In various embodiments, the bins may contain either complex values or real values. For example, the real values could be presented in terms of positive real quantities X(f) of the complex values, the quantities X representing magnitudes of various frequency components f of the acquired signal, presented e.g. as an actual magnitude, a squared magnitude, or as a compressive transformation of a magnitude, such as a square root or a logarithm. In other examples, the real values could be presented in terms of either positive or negative real quantities X(f) of the complex values, the quantities X representing phases of various frequency components f of the acquired signal.

Frequency bins come into play in context of FFT algorithms employed by various receivers in that separation of a particular signal of interest from the total signal acquired by a receiver, e.g. separation of a radar or sonar signal reflected from a particular object of interest or separation of an acoustic signal generated by a particular acoustic source of interest from an acquired acoustic signal that contains contributions from various acoustic sources, may be achieved by identifying which bin(s) correspond to the signal of interest and/or by identifying which bin(s) may be active. To that end, bins are evaluated to determine whether they contain values that satisfy one or more predefined criteria. For example one criterion could include comparing a value of a bin with a certain threshold value to determine whether the bin may be classified as containing a "peak" indicating that relatively large amount of energy of the acquired signal is concentrated in that bin. Various algorithms may be carried out in order to determine where to set the level threshold to indicate presence or absence of a peak in each bin, all of which algorithms are within the scope of the present disclosure.

In practice, a two-dimensional array of values as described above is typically generated for every input antenna and a receiver typically contains more than one antenna, thus making an array a three-dimensional array, the third dimension indexing different antennas. The above described processing is performed on every antenna rectangle slice of such a three-dimensional array, possibly followed by the beam forming of the antennas.

What many different known FFT approaches have in common is that they do computation in stages by dividing the digital points representing a signal into subsets (in a process known as "decimation"), computing the DFT of each subset, and then processing the results of the DFT of each subset to produce a final result consisting of a set of frequency-domain points. Expressed differently, such FFT approaches break up DFT computation into stages where each stage computes a smaller DFT and then use some kind of structure to combine the results of the computation at different stages.

Figure 1B:
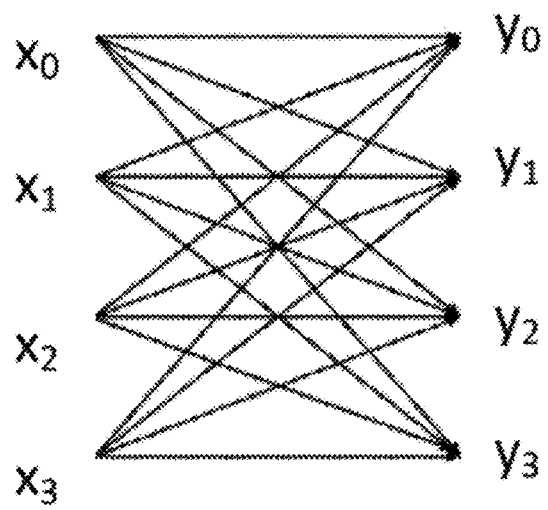

Most of the computational effort of the FFTs lies in the processing of the subsets. The processing occurs in a series of stages in which the subsets are first processed into intermediate results, the intermediate results are further processed, and so on, until the final set of frequency-domain points is produced. Each stage includes a plurality of parallel operations that each process r input points simultaneously to produce r output points—the value r being known as the "radix" of the FFT algorithm. Because a dataflow diagram of a radix-2 (i.e., a radix with a value of r=2) operation resembles a butterfly (as shown in FIG. 1A, in which input points x0, x1 are processed into output points y0, y1 in accordance with the equations y0=x0+t*x1 and y1=x0−t*x1), "t" being referred to as a "twiddle factor," these operations are known as "butterfly operations" or simply "butterflies." Operations having other radices are also known as butterfly operations (such as the radix-4 operation shown in FIG. 1B, for r being equal to four).

Floating-Point Vs Fixed-Point Representations

The values within an array comprising the results of applying an FFT may be represented either as fixed-point numbers or floating-point numbers.

As is well-known in context of computing, a fixed-point number has a specific number of bits or digits reserved for the integer part (i.e. the part of the number to the left of the decimal point) and a specific number of bits reserved for the fractional part (i.e. the part of the number to the right of the decimal point). No matter how large or small a number is, it will always use the same number of bits for each portion. For example, if a fixed-point format is in decimal III-II.FFFFF, then the largest positive number that could be represented would be the binary 11111.11111=31.96875 if unsigned and 01111.11111=15.96875 if signed and the smallest positive would be binary 00000.00001=0.03125. Such representation requires that a processor processing such numbers has knowledge of where the decimal point is. In the following, "bits", which is inherently a binary representation, are sometimes described with reference to decimal representations, however, based on the descriptions provided herein a person of ordinary skill in the art would readily recognize which is which.

As is also well-known, a floating-point number does not reserve a specific number of bits for the integer part or the fractional part. Instead, it reserves a certain number of bits for the number (called the "mantissa" or "significand") and a certain number of bits to indicate where, within that number, the decimal place is (called the "exponent"). Thus, a floating-point number expressed using 10 digits with 2 digits reserved for the exponent can represent a largest value of 9.9999999e+50 and a smallest value of 0.0000001e-49, considering, for simplicity, unsigned floating-point numbers. For signed floating-point numbers the smallest value would be −9.9999999e+50.

Sometimes, looking at the numbers of identical width, integer representation can be more accurate than floating-point representation since mantissa itself loses some of the bits to the exponent. However, the higher is the algorithm's dynamic range, the better is floating-point vs fixed-point. In general, floating-point representation can provide greater accuracy because, with a fixed number of digits, numbers of different orders of magnitude can be represented. On the other hand, a fixed-point processing implementation is often associated with lower cost and power consumption because fixed-point representation may use integer hardware operations controlled by a software implementation prescribing a specific convention about the location of the binary or decimal point, for example, 6 bits or digits from the right. The hardware to manipulate these representations is less costly than floating-point, and it can be used to perform normal integer operations as well. Therefore, it is often advantageous to use fixed-point FFTs. However, it is not always possible to use fixed-point FFTs because it is difficult to adequately control their stage growth, described in greater detail in the following section.

Stage Growth of Fixed-Point FFTs

An output signal from each of the consecutive stages of an FFT algorithm may be larger than an input signal provided to that stage as a result of performing the computations of the stage. Factors by which an input signal may grow in each stage differ depending on the type of the input signal. For example, a delta function input signal will experience no growth at all, a substantially random input signal (i.e. an input signal comprising many different frequencies and therefore appearing "random" from the perspective of its frequency representation) may grow by a factor of sqrt(2) every radix-2 stage (or a factor of 2 every other radix-2 stage), while a substantially complex exponential, e.g. sinusoidal, input signal (i.e. a single frequency signal) may grow by a factor of 2 every radix-2 stage.

As is well-known, computers typically implement binary multipliers, i.e. multiplication is carried out by representing numbers in base 2 form, where multiplication of any two numbers is reduced to just shifting and adding bits. In such implementations, a growth (gain) of a value by a factor of 2 or a scale down of that value by a factor of 2 means shifting by one bit in the correct direction. For example, a growth by a factor of 2 from e.g. a value of 3 ("11" in binary representation) to a value of 6 ("110" in binary representation) is expressed as shifting "11" (i.e., the value of 3) left by one bit, to arrive at 110 (i.e., the value of 6). Similarly, scaling down by a factor of 2 from e.g. a value of 6 to a value of 3 is expressed as shifting "110" right by one bit, to arrive at "011." Thus, growth by a factor of 2 may be described as a growth by 1 bit, growth by a factor of 4 may be described as a grown by 2 bits, and so on. Consequently, the growth by a factor of sqrt(2) every radix-2 stage (or a factor of 2 every other radix-2 stage) for a random signal input may be viewed as a growth of 1 bit every other radix-2 stage or 0.5 bit every radix-2 stage, while the growth by a factor of 2 every radix-2 stage for a complex exponential, e.g. sinusoidal, input signal may be viewed as a growth by 1 bit every radix-2 stage. Thus, FFT output can grow from as much as 1 bit (or more) per radix-2 stage, for a complex exponential type of input, to as little as no growth at all, for a delta function input. On average, however, the growth is 0.5 bits per radix-2 stage, as is the case for the random input signal.

Growth of the FFT output at each stage is a well-known problem with fixed-point FFTs where, as previously described, no matter how large or small a number to be represented is, it can only use the same predefined number of bits for each of the integer and the fractional portions. But growth at each stage may result in overflows, i.e. situations where a calculation produces a result that is greater in magnitude than that which a predefined fixed-point implementation can store or represent. In case of an overflow, a given memory element stores or represents the largest value that it can store or represent, a condition called "saturation." In other words, the computation result is clipped to the maximum value.

Since overflow results in that a computation result cannot be correctly represented, typically, fixed-point FFT algorithms try to avoid or significantly limit the overflows. One way to avoid overflows is to apply scaling after some or all stages of an FFT algorithm, which may be done in different manners, some examples of which are described below.

Scaling FFT Outputs: Example #1 ("Low" Gain)

Figure 2:
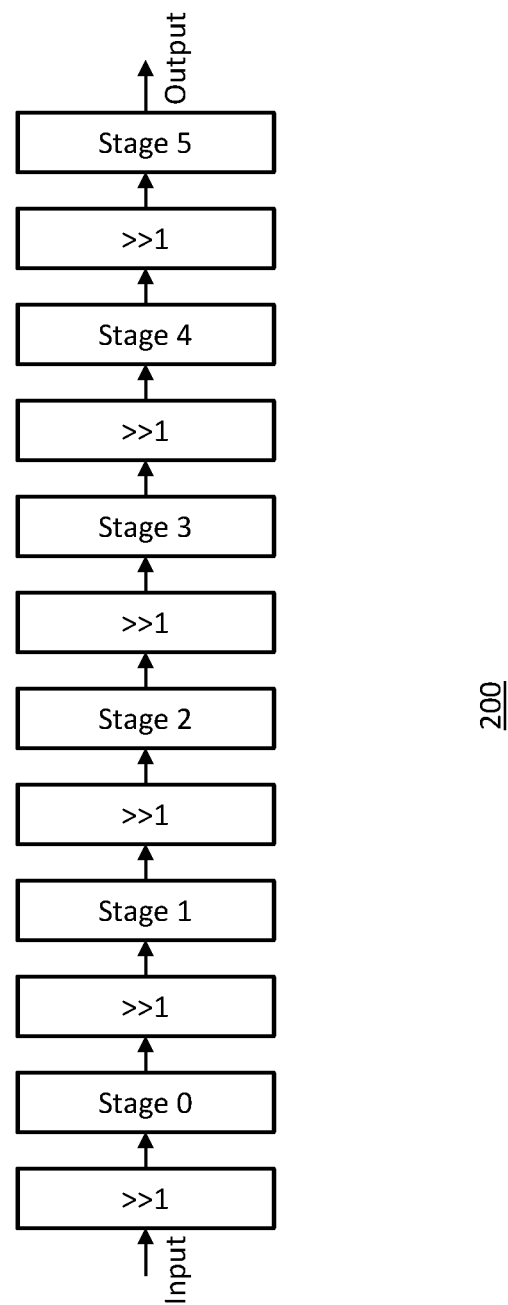
FIG. 2 illustrates scaling for an exemplary 6-stage radix-2 FFT algorithm, according to one embodiment of the present disclosure.

One robust scaling approach involves scaling the output down by 1 bit every radix-2 stage. An example for a 6-stage 64-point FFT is shown in FIG. 2, where each of the boxes indicated as ">>1" represents a right shift by 1 bit. As previously described herein, right shift by 1 bit means scaling down by a factor of 2 (i.e. multiplying the signal by ½).

Scaling as illustrated in FIG. 2 allows avoiding overflow for most of the input signals that may be encountered in practice, since bit growth in a single stage can exceed 1 bit but this is rare enough, e.g. bit growth can exceed 1 bit per stage for some complex exponential input signals where multiplication by an exponential twiddle factor "rotates" the input exponential, which can increase its real or imaginary element by a factor of sqrt(2), and then addition nearly doubles it. Avoiding overflow for most of potential input signals is desirable, but it comes at a cost: since an average growth is only 0.5 bits per radix-2 stage, for an average input signal, this type of scaling needlessly loses some bits of resolution. For the case with 6 stages illustrates in FIG. 2, three bits (i.e. 6 stages times 0.5 bits per stage) of resolution may be lost needlessly, impacting commercial viability of fixed-point FFTs.

Scaling FFT Outputs: Example #2 ("High" Gain)

Figure 3:
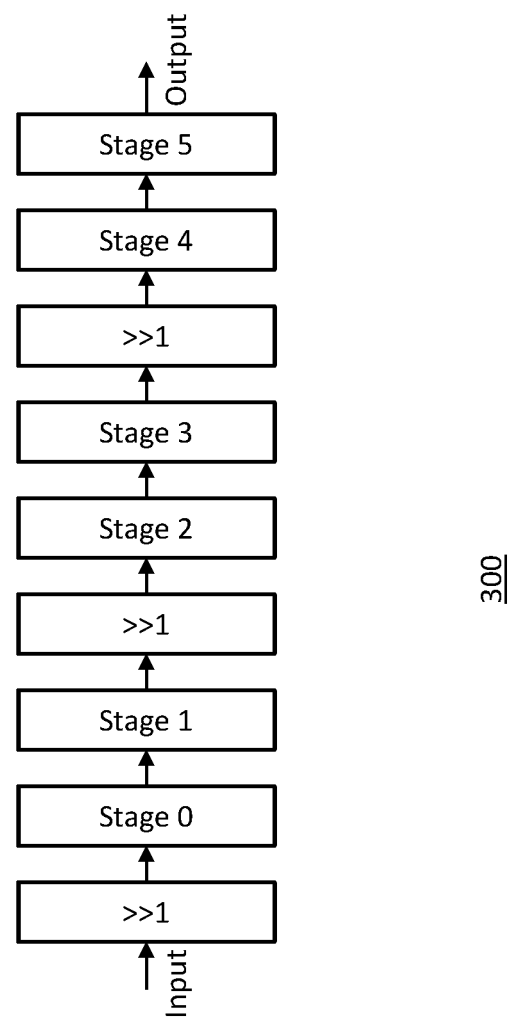
FIG. 3 illustrates scaling for an exemplary 6-stage radix-2 FFT algorithm, according to another embodiment of the present disclosure.

In various applications, less aggressive scaling techniques, i.e. techniques that would not loose so many bits for an average input, than the one described in example #1 above may be appropriate. One such scaling, described in co-pending U.S. patent application Ser. No. 14/875,281 "Scaling Fixed-Point Fast Fourier Transforms in Radar and Sonar Applications" filed 5 Oct. 2015 and incorporated herein by reference in its entirety, may include scaling, e.g. by multiplying, an output of every pair of consecutive butterfly stages of a fixed-point FFT by a scaling factor equal to two times of the inverse of a growth factor for the pair of consecutive butterfly stages for the FFT algorithm for a purely complex exponential input signal and no further actions trying to prevent overflow are taken. In other words, an output of every other radix-2 stage may be scaled down by 2 (i.e. the output is effectively multiplied by ½), as illustrated in FIG. 3, amounting to scaling by 1 bit per every other radix-2 stage or 0.5 bits per every radix-2 stage. In case radix-4 stages are used, such scaling would involve that an output of every radix-4 stage is scaled down by 2 (not shown in the FIGUREs), which is effectively the same as scaling down by 2 every other radix-2 stage.

Such scaling could be appropriate for substantially random input signals because, as described above, such input signals grow by a factor of 2 every pair of radix-2 stages (or by a factor of 2 for every radix-4 stage). Broadband signals used for encoding data in multicarrier systems such as e.g. Orthogonal Frequency Division Multiplexing (OFDM) may be considered as such highly random signals, and this scaling may be used for such signals.

As described in the co-pending U.S. patent application Ser. No. 14/875,281, such scaling may also be used in implementations where the core clean signal is a complex exponential or a sinusoidal which may be degraded by a broadband noise, and where the required precision grows as the noise increases, which is the case in e.g. radar and sonar applications. As described in the co-pending U.S. patent application Ser. No. 14/875,281, in such implementations, besides the scaling, input signals may be allowed to overflow by saturation, as long as, when the overflow does occur, the signals are saturated at their max or min level, rather than letting them "wrap around." Mild saturation is equivalent to adding some noise to a signal, while full wrap around degrades the signal by the maximum possible value.

A random input signal provided to an FFT algorithm of a data processing system of a radar/sonar receiver implies that the received signal is very noisy (since the core signal should be baseband). For a radix-2 FFT, a highly random input signal grows by a factor of sqrt(2) every stage. Therefore, the signal grows by a factor of 2 (i.e. sqrt(2)×sqrt(2)) every other radix-2 stage. With such growth, scaling the signal by a factor of 2 every other radix-2 stage typically will not result in overflow because such scaling will provide sufficient compensation for the growth. As previously described, overflow results in that a computation result cannot be correctly represented, which degrades the received signal. Not having an overflow means that the received signal is not degraded further by adding noise due to overflow, thus increasing the SNR when compared to a conservative, lower-gain, conventional approach of scaling every stage, which is exactly what is needed for successful processing of highly random signals.

A purely complex exponential input signal (i.e. a signal comprising a single frequency) provided to an FFT algorithm of a radar/sonar receiver implies that the received signal is very clean and noise-free. For a radix-2 FFT, a purely complex exponential input signal grows by a factor of 2 every radix-2 stage. Therefore, the signal grows by a factor of 4 (i.e., 2×2) every other radix-2 stage. With such growth, scaling the signal by a factor of 2 every other radix-2 stage will likely result in overflow by saturation because it will not compensate for the growth of 4 every other radix-2 stage, increasing the noise and reducing SNR. Such a reduced SNR may, however, still be acceptable in certain applications. For example, in a radar/sonar receiver where only presence and location of a peak needs to be identified and not its exact magnitude, because, since the received reflected signal was very clean and noise-free to begin with, high SNR is not required to identify a peak in the FFT output.

An input signal that is somewhere between a purely complex exponential waveform and a highly random signal implies that the received signal is not quite clean and noise-free, but degraded by broadband noise. The closer such a signal is to a random signal, the more noise there is. For a radix-2 FFT, such an input signal would grow by a factor that is between sqrt(2) and 2 every radix-2 stage.

Therefore, the signal grows by a factor between 2 and 4 every other radix-2 stage. The higher-gain scaling summarized above aims to achieve a balance between the amount of noise due to overflow by saturation and the cleanliness of the input signal, the latter, in turn, dictating the SNR necessary to successfully process such a received signal by a receiver:

received signals that are not purely complex exponential but include relatively little noise (i.e. signals only having a relatively small contribution of random signal) will have a growth factor per radix-2 stage that is closer to 2 than to sqrt(2) and, therefore, may overflow by saturation resulting in more noise being added (i.e. decreased SNR), which is acceptable because such signals were relatively clean to begin with and, therefore, do not require high SNR to be successfully processed, received signals that are not purely random but do include relatively large noise components (i.e. signals having a relatively large contribution of random signal) will have a growth factor per radix-2 stage closer to sqrt(2) than to 2 and, therefore, are less likely to overflow by saturation resulting in less noise being added (i.e. increased SNR), which is advantageous because such signals need the increased SNR to be successfully processed.

For a radix-4 FFT algorithm, growth at each radix-4 stage is a factor of 4 for purely complex exponential input signals and a factor of 2 for random input signals. Therefore, corresponding scaling for a radix-4 FFT would be scaling twice as much as for radix-2, described above.

Since scaling down reduces the overall gain of an FFT algorithm, i.e. the factor by which the input to an FFT grows, the greater the particular scaling, the lower is the gain of an FFT algorithm employing such scaling. Thus, an FFT as shown in FIG. 2 may be considered to be a "low-gain" FFT (greater scaling) when compared to an FFT shown in FIG. 3, which would then be considered to be a "high-gain" FFT.

Higher-Gain Vs Lower-Gain FFTs

As described above, FFTs having higher gains and FFTs having lower gains each have their pro's and con's. Lower-gain FFTs may sufficiently compensate for the stage growth (i.e. avoid saturation), but at the cost of losing bits of resolution. Higher-gain FFTs may save bits of resolution in some cases, but may not sufficiently compensate for stage growth in other cases, resulting in saturation. It is possible to try to avoid saturation by conditioning the input signal to an FFT to be limited in magnitude, but that reduces the dynamic range of input signals on which the FFT can operate, resulting in an FFT with a limited dynamic range.

FFT Reconstruction: FFT Computation with High Dynamic Range

Embodiments of the present disclosure provide an improved technique, referred to herein as an FFT reconstruction technique, for generating fixed-point FFTs. The technique includes providing an input signal to two or more fixed-point FFT algorithms that apply different amounts of scaling to limit growth of their output, resulting in each of the FFT algorithms yielding an array of FFT output values characterized by a different gain. The technique further includes determining, on a per-value basis of the FFT output (i.e. per-FFT_output_value basis), whether an output value of an FFT algorithm with a relatively high gain was clipped due to saturation. If not, then the output value of that FFT algorithm (i.e., the FFT algorithm with the relatively high gain) is included in the final FFT. Otherwise, an output value of an FFT algorithm with a lower gain is included in the final FFT, the value being appropriately scaled to match the values contained in other array elements of the final FFT. Reconstructing the final FFT by combining the FFT values of at least two FFT algorithms with different gains allows benefiting from the advantages of both higher- and lower-gain FFTs while avoiding or minimizing their disadvantages.

Figure 4:
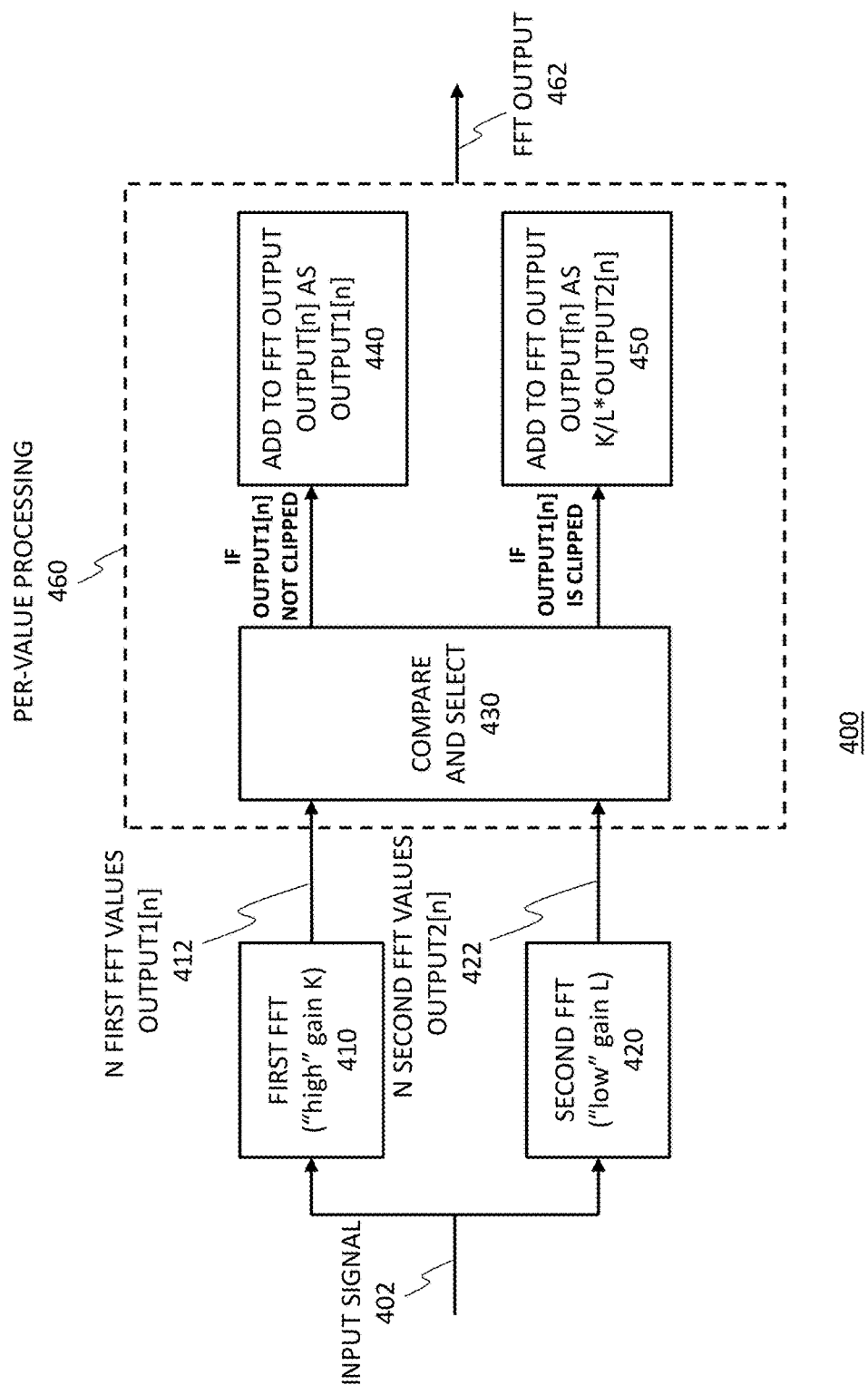
FIG. 4 provides a schematic illustration of an FFT reconstruction method for generating an FFT output for an input signal based on two FFT algorithms having different gain values, according to one embodiment of the present disclosure.
Figure 12:
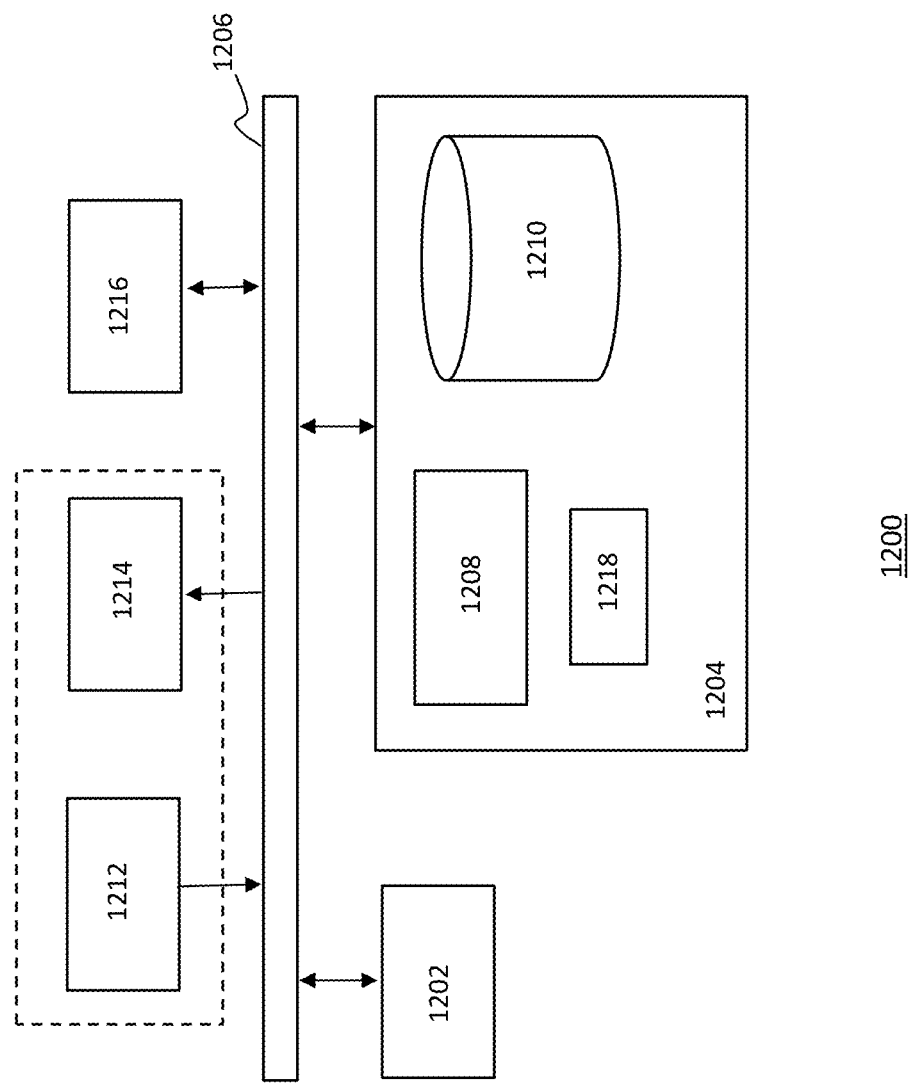
FIG. 12 depicts a block diagram illustrating an exemplary data processing system, according to some embodiments of the disclosure.

FIG. 4 provides a schematic illustration of an FFT reconstruction method 400 for generating a reconstructed FFT output 462 for an input signal 402 based on two FFT algorithms having different gain values, according to one embodiment of the present disclosure. Any data processing system comprising at least a processor and a memory may be configured to implement the method 400 or processing of other embodiments described herein. An exemplary data processing system is shown in FIG. 12.

As shown in FIG. 4, the method 400 may begin with the input signal 402 being provided to a first FFT algorithm 410 and a second FFT algorithm 420. The first and second FFT algorithms are such that one has a higher gain than another. The example of FIG. 4 illustrates that the first FFT algorithm 410 may have a gain K that is higher than a gain L of the second algorithm 410, which means that, to be properly represented (i.e. not clipped to the maximum value due to saturation), the FFT output of the first FFT algorithm may require more bits than the FFT output of the second FFT algorithm. In other words, the second FFT algorithm 420 is the one that applies a more aggressive scaling than the first algorithm FFT 410. In some embodiments, the first FFT algorithm 410 may be the "high" gain algorithm of example #2 described above, while the second FFT algorithm 420 may be the "low" gain algorithm of example #1 described above. However, in general, the FFT algorithms 410 and 420 may include any fixed-point FFT algorithms and any manner of scaling applied to limit the grown of their outputs characterized, respectively, by a higher and a lower gain.

In some embodiments, the first and second FFT algorithms may comprise the same number and types of stages. For example, both may include six radix-2 butterfly stages, the first and second FFT algorithms being different in the type of scaling applied to one of more of their stages. However, in other embodiments, the first and second FFT algorithms may differ in the number and/or types of stages used in each of them, as long as they are still characterized by their respective gains K and L and produce comparable outputs. For example, one FFT algorithm may include 6 stages, while another may include 8 stages, and/or one FFT algorithm may include radix-2 stages while another may include radix-4 stages.

The first and second FFT algorithms may also differ in the stage at which scaling is applied for the first time. In general, the first and second FFT algorithms may be configured so that scaling is applied after the first stage when saturation is possible, for an expected input signal.

In some embodiments, each of the gain factors K and L may be selected based on the input headroom, i.e. a difference between a number of bits provided for representing the output of each of the first FFT algorithm and the second FFT algorithms and a number of bits used for representing the input signal. For example, consider that the number of bits used for representing the input signal is 12, e.g. because the analog-to-digital converter (ADC) (not shown in FIGUREs) preceding the first and second FFT algorithms and providing the input signal thereto is a 12-bit ADC. Further consider that both the first and the second FFT algorithms are 16-bit algorithms, i.e. they can present their output using 16-bit fixed-point representation. In such a case, the input headroom is 4 bits for each FFT algorithm and the algorithms may be designed to apply scaling that results in a particular relation of their gains K and L to the input headroom. For example, the first FFT algorithm 410 may apply such scaling that it results in gain K being equal to a ratio of the input headroom to a square root of N, while the second FFT algorithm 420 may apply such scaling that it results in gain K being equal to a ratio of the input headroom to N, where N is the number of elements in an FFT output of each of the algorithms.

In some embodiments, each of the first and second FFT algorithms may include applying a respective horizontal windowed FFT algorithm on rows of data samples of the input signal 402, followed by applying a respective vertical windowed FFT algorithm on an output of the horizontal windowed FFT algorithm.

In general, application of each of the first and second FFT algorithms to I samples of an input signal results in a respective FFT output being produces comprising N values indexed with an index n, e.g. n may be an integer in the range [1:N], however any type of indexing may be used, including multi-dimensional indexing in case an FFT output is presented as a multi-dimensional array, or tensor, of values. The number of samples I of the input signal used to compute the FFTs on may, but does not have to be equal to the number N of values in an FFT output.

The N output values of the first FFT (i.e. the result of applying the first FFT algorithm 410 on the input signal 402), indicated in FIG. 4 as N first FFT values Output1[n] 412, and the N output values of the second FFT (i.e. the result of applying the second FFT algorithm 420 on the input signal 402), indicated in FIG. 4 as N second FFT values Output2[n] 422 are provided to a per-value processing block 460.

The per-value processing 460 is configured to construct the final FFT output 462 by comparing and selecting, on a per-FFT output value basis (i.e. for each output value indexed with a particular index n, which is done for all N different indices), the value of an FFT output of the highest gain that has not clipped due to saturation. To that end, the per-value processing 460 includes comparison and selection 430, in which, for a particular value of the index n, an FFT output value indexed by that index n of the first FFT 412 and the FFT output value indexed by that index n of the second FFT 422 are compared to determine whether their relation satisfies a certain predefined condition that would indicate that the FFT output value of the higher-gain FFT algorithm was not clipped at any of the stages. Various manners for making such determination are described in the following section "Detection of clipping."

Upon positive determination, i.e. when it is determined that the first FFT output value Output1[n] is not clipped, that value is added to the final FFT output 462 at a place within the final FFT indexed with the index n, as shown in FIG. 4 with a box 440. Upon negative determination, i.e. when it is determined that the first FFT output value Output1[n] is clipped, a value computed based on the value of the second FFT output value Output2[n] is added to the final FFT output 462 at the place within the final FFT indexed with the index n, as shown in FIG. 4 with a box 450. Performing the per-value processing 460 for each of the N values of the FFT outputs of the first and second algorithms 410 and 420 will result in populating the N places holding the values of the final FFT output 462.

Typically, the data processing system implementing the first and second FFT algorithms would be designed so that at least some, preferably most, of the first FFT values Output1[n] are not clipped at any stages of the first FFT algorithm 410, in which case those FFT values will be added to the final FFT output 462. In case some of them are clipped, corresponding values of the second FFT 422 need to be scaled so that they would be comparable to the other values of the final FFT output 462. When the gain of the first FFT algorithm 410 is K and the gain of the second FFT algorithm 420 is L, and provided that the output value of the second FFT 422 that is indexed with an index n is not clipped (i.e. Output2[n] is not clipped), then the corresponding output value of the first FFT 412, Output1[n] may be computed by multiplying the value Output2[n] by K/L, as shown in FIG. 4 in the box 450. Such a value may then be added to the final FFT output 462, as the FFT element indexed with the index n, in case the first FFT value Output1[n] is clipped.

Based on the discussions provided herein, a person of ordinary skill in the art would be able to easily extend the illustration provided in FIG. 4 to implementations where more than two FFT algorithms with different gains are employed, all of which are within the scope of the present disclosure. Such implementations may allow for more flexibility in achieving the highest dynamic range of the final FFT output. For example, for a scenario with three FFT algorithms, an output value [n] of the highest-gain FFT algorithm is compared with one or more of the output values of the same index from the other FFT algorithms to determine whether it is clipped. If so, then analogous determination is made for the output value [n] of the next highest-gain FFT algorithm, and so on, until it is determined that the value is not clipped. The final FFT output is then constructed by taking one or more output values, of the highest-gain FFT algorithm, which were not clipped, and by computing the rest of the values based on the corresponding output values from the next-highest-gain FFT algorithm that were not clipped, scaled appropriately to account for the differences in gains of the different FFT algorithms the output values of which were used in the reconstruction.

For example, consider that, in an FFT reconstruction method analogous to the method 400 of FIG. 4 three FFT algorithms with gains G1, G2, and G3 are implemented, where G1>G2>G3 (i.e. the first FFT algorithm has the highest gain G1, and the third FFT algorithm has the lowest gain G2). Then consider that, e.g. for index n=1, FFT output value with the index [1] of the first algorithm, Output1[1], is determined to be clipped due to saturation, and so is the FFT output value with the index [1] of the second algorithm, Output2[1]. The system may be assumed to be designed so that the corresponding FFT output value of the third algorithm, Output3[1] is not clipped. In this case, this value will be used for computing the output value for the index [1] for the final FFT output. But first it is necessary to determine which, of the three FFT algorithms, is the one with the highest gain and resulted in one or more FFT output values that were not clipped. Consider that, e.g. for index n=2, FFT output value with the index [2] of the first algorithm, Output1[2], is determined to not be clipped. This means that the value of this FFT algorithm will be used as the corresponding value in the final FFT output, i.e. value in the final FFT output Output[2]=Output1[2]. This also means that all other values placed in the final FFT output will need to be scaled to account for the differences with the gain G1. Continuing with the example of index n=1, this means that value in the final FFT output Output[1] may be calculated based on the corresponding FFT value of the third FFT algorithm (the highest-gain one that did not clip), Output3[1], as Output[1]=G1/G3*Output3[1]. Considering another example, e.g. of index n=3, where the FFT output value with the index [3] of the first algorithm, Output1[3], could be determined to be clipped, but the FFT output value with the index [3] of the second algorithm, Output2[3] is not, the corresponding FFT value of the third algorithm, Output[3] would be determined as Output[3]=G1/G2*Output2[3], and so on.

Providing the input signal to multiple FFT algorithms characterized by different gains, allows achieving higher dynamic range of computing a reconstructed FFT output that would be possible if only a single FFT algorithm with a particular gain and a certain dynamic range is used. In other words, using two or more FFT algorithms each having certain dynamic range to reconstruct an FFT output as described herein effectively increases the dynamic range of the final FFT output.

Next, various manners for detecting, during the per-value processing block 460, whether a particular value [n] of an FFT output of one of the FFT algorithms is a clipped value.

Detection of Clipping

In the simplest implementation, the method as described above may be modified to operate by simply comparing a value [n] of an output of the highest-gain FFT algorithm with a particular threshold value, with could but does not have to be selected specifically for that index n, to determine whether it is likely that the output value [n] of that FFT algorithm is clipped. While such implementation would be computationally simple, it may have the drawback that if the FFT output saturated in one of the middle stages of the FFT algorithm, then the saturation result may affect multiple output points and none of them would have to be large, erroneously providing an indication that no clipping has occurred.

Therefore, in the preferred embodiments, detection of clipping is based on comparison with corresponding output values of one or more other FFT algorithms. Assuming that a value [n] of an output of at least one FFT algorithm of the plurality of FFT algorithms used in the improved FFT computation method as described above is not clipped, which is a reasonable assumption for a well-designed FFT data processing system, corresponding output values [n] of one or more other, higher-gain, FFT algorithms may be compared against that value to determine whether they are clipped. Comparison may be implemented in many manners which are based on recognition that the output value of every non-saturated point of a higher-gain FFT algorithm, e.g. with the gain K, should be equal to or reasonably close to K/L times the value of the corresponding point of the lower-gain FFT algorithm with the gain L that is not clipped. Some of the example embodiments of performing such comparison are described below. Based on this description, a person of ordinary skill in the art would be able to envision other comparison approaches, all of which are within the scope of the present disclosure.

Continuing with the example in which two FFT algorithms are implemented as shown in FIG. 4, in one embodiment, comparison of the first value Output1[n] (i.e. output of index [n] of the higher-gain FFT algorithm) and the second value Output2[n] satisfies the condition indicating that the first value Output1[n] is not clipped could include multiplying the second value Output2[n] by K/L, subtracting from the result of the multiplication the first value Output1[n], and then evaluating the result to determine whether the result of the subtraction is within a predefined range comprising at least a value of zero. In various embodiments, the predefined range in this case could be a certain range of values centered at zero, could just include one value of zero, or could be a range of values not centered at zero, e.g. from a certain negative value to a certain positive value where the absolute values of the negative and positive values are different. Preferably, the range is defined in such a manner as to reduce the probability of erroneously concluding that the first value Output1[n] (i.e. output of index [n] of the higher-gain FFT algorithm) is clipped when that value is actually not clipped.

For example, consider that an absolute value of (Output1[n]−K/L*Output2[n]) is compared with a certain threshold T1 (i.e., the range is [−T1; T1]). Making the range "too tight" (i.e., T1 is too small) may result in selecting the second FFT algorithm 420, even if the first one 410 did not saturate, thus negating the value of the improved method described herein. Making the range too "loose" (i.e. T1 is too large) may result in selecting the first FFT algorithm 410 even if it saturated. In general, the range should not be lower than the worst case precision of the second (i.e., lower-gain) FFT algorithm, where "precision" of an FFT algorithm refers to comparison of an output of a particular fixed-point FFT algorithm to an ideal calculation with infinite precision. For example, the threshold may be chosen as two times of this precision, e.g. as $2*\sqrt{N}$/(Input Headroom). Thus, in an embodiment, the comparison could be as follows: abs(Output1[n]−(K/L)*Output2[n])<$2*\sqrt{N}$/(Input Headroom).

The multiplication and subtraction test as described above may, effectively, be carried out in many ways, all of which are within the scope of the present disclosure. For example, it may be carried out exactly as described above by computing ((K/L)*Output2[n]−Output1[n]) and comparing the result with a certain first range that includes at least a value of zero. Alternatively, it may be carried out by computing (Output1[n]−(K/L)*Output2[n]) and comparing the result with a certain second range that includes at least a value of zero, which range could be different from the first range, or it may be carried out by computing the absolute value of any of these subtraction and comparing the result with a certain threshold.

It should be noted that FFT gains K and L can normally be presented in a power of 2 form, i.e. K/L is equal to $2^M$, where M is an integer. In such a case, multiplication by K/L can be implemented using a fixed value shifter (which could be implemented in hardware, eliminating the need for having corresponding software logic), to apply a left shift of M bits to the second value Output2[n].

In another embodiment, again continuing with the example in which two FFT algorithms are implemented as shown in FIG. 4, comparison of the first value Output1[n] (i.e. output of index [n] of the higher-gain FFT algorithm) and the second value Output2[n] satisfies the condition indicating that the first value Output1[n] is not clipped could include dividing the first Output1[n] by the second value Output2[n], and determining whether a result of the dividing is within a predefined range comprising at least a value of K/L. A person of ordinary skill in the art would be able to derive considerations for choosing an appropriate range in this case based on the considerations regarding range provided above.

Yet other embodiments of performing the comparison may be used in case the data processing system includes one or more logarithm circuits capable of converting values from a Cartesian domain to a logarithm domain, and possibly one of more exponential circuits capable of the reverse conversion. This embodiment is based on a recognition that some processors are configured with instructions to compute logarithms and exponents, for example with log 2 and exp2 instructions which could be used e.g. for the purpose of greater dynamic range when representing numbers between 0 and 1. Processor instructions to compute logarithms and exponents are referred to in the following as "log circuits" and "exp circuits," respectively. This embodiment is further based on an insight that the use of the existing log and exp circuits could be extended to compute certain other functions by using the existing log and exp circuits to transform from a Cartesian to a logarithmic domain and vice versa and performing the actual computations of the functions in the logarithmic domain because doing so may be computationally easier than performing the computations in the Cartesian domain. For example, such an approach may be useful for functions such as division and multiplication, in case the processor does not have multiplication or division instructions, because multiplication and division in a Cartesian domain translates to simple addition and subtraction in a logarithmic domain, as illustrated by the following equations:

$$(xy) = \exp_b(\log_b(x) + \log_b(y)) \quad (1)$$

$$(x/y) = \exp_b(\log_b(x) - \log_b(y)) \quad (2)$$

According with this approach, in one embodiment, determining whether comparison of the first value Output1[n] and the second value Output2[n] satisfies the condition could include computing a logarithm of the first value Output1[n], computing a logarithm of the second value Output2[n], subtracting the logarithm of the second value Output2[n] from the logarithm of the first value Output1[n], and determining whether a result of the subtracting is within a predefined range comprising at least a value of log(K/L), which log value could be pre-computed and stored for reference. In such an embodiment, comparison is performed in the log domain. However, in other embodiments, comparison may be performed in the Cartesian domain by first computing an exponent of a result of the subtracting, and then determining whether the exponent is within a predefined corresponding range comprising at least a value of K/L. In all of these embodiments, again, a person of ordinary skill in the art would be able to derive considerations for choosing an appropriate range in this case based on the considerations regarding range provided above.

Simulation Results

FIGS. 5-10 provide simulation results for an exemplary signed fixed-point 16-bit integer FFTs configured to saturate at the value of +32,767 or −32,768. The value of 32,767, referred to in the following as "32K," is the maximum value that may be represented by the fixed-point FFT implementation of this example because this is the maximum possible value of a signed 16-bit integer ($32,767 = 2^{15} - 1$). In other words, 16-bit integer, saturated, rather than wrapped around, implies positive saturation at 32,767=0x7FFF and negative saturation at −32,768=0x8000.

Figure 5:
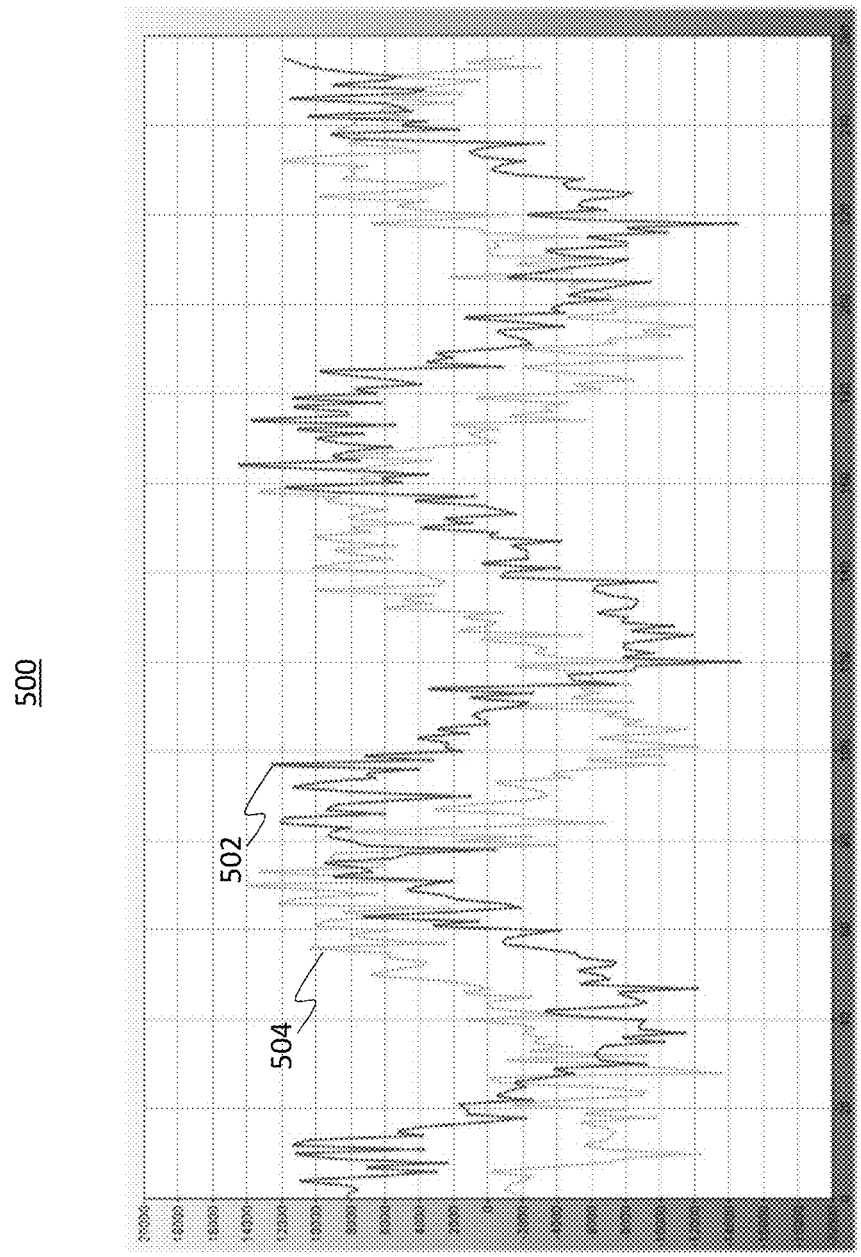
FIG. 5 shows a plot illustrating real and imaginary parts of an input signal, according to some embodiments of the disclosure.

FIG. 5 shows a plot 500 illustrating real and imaginary parts of an exemplary input signal comprising some noise. In FIG. 5, curve 502 represents the real part of such a noisy complex input waveform, while curve 504 represents the imaginary part.

Figure 6:
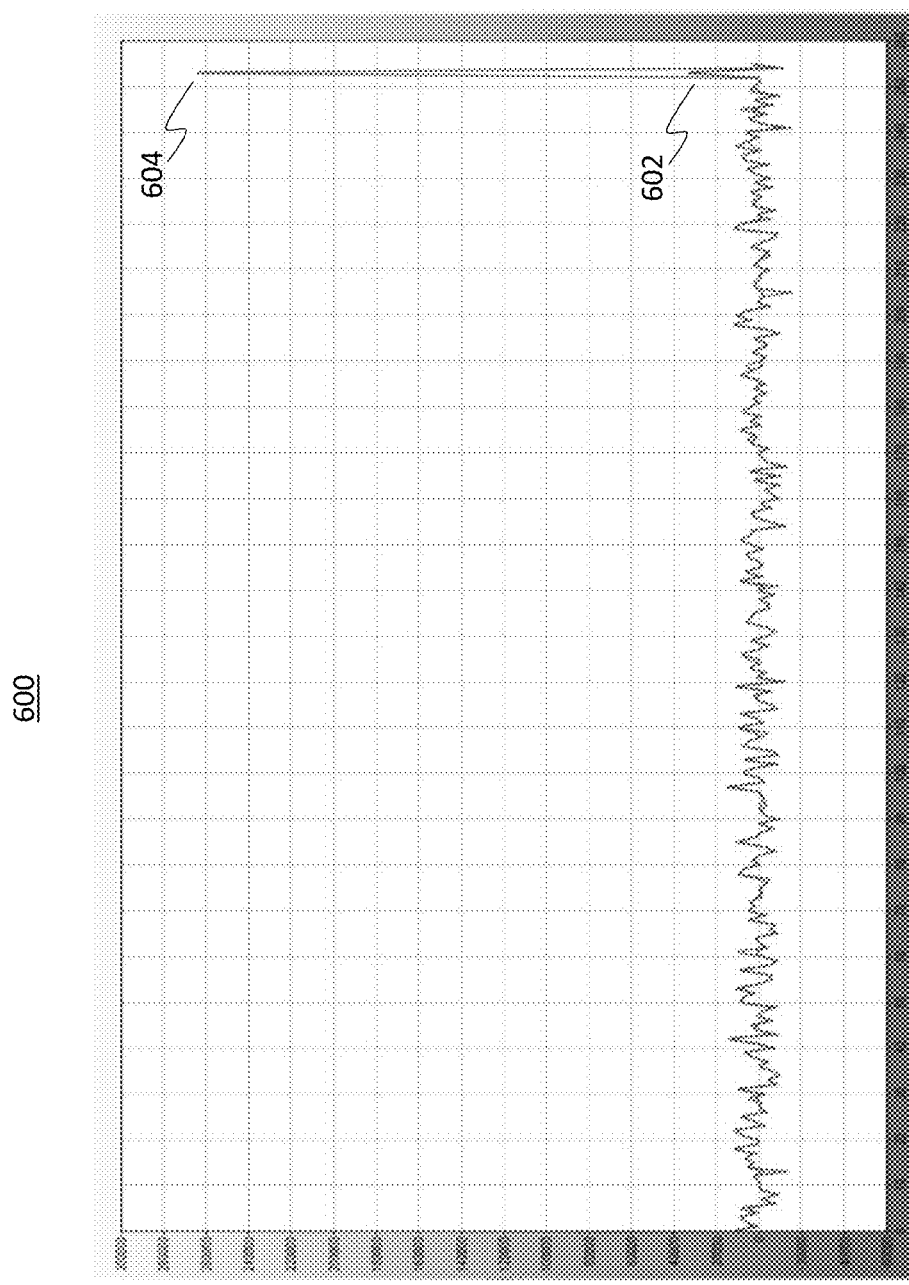
FIG. 6 shows a plot illustrating simulation results for a 256-point FFT of an input waveform as shown in FIG. 4, superimposed over results of an ideal FFT model for the same input waveform, according to some embodiments of the disclosure.

As shown in FIG. 5, the amplitude of the waveform is at about 14K, i.e. nearly half of the total signed 16-bit dynamic range of the FFTs. Just done in 16-bit, using scaling by 0.5 bits for every radix-2 stage, an FFT algorithm would saturate significantly. FIG. 6 shows a plot 600 illustrating simulation results for a 256-point FFT of an input waveform as in FIG. 4 and implementing scaling by 0.5 bits for every radix-2 stage, shown as a curve with an FFT peak 602, superimposed over an ideal FFT model (i.e. results of computing an FFT for the same input waveform, but when there is no clipping due to saturation) with an FFT peak 604. In this simulation, the ideal model was computed keeping twiddles at 16 bits, but data at 32 bits throughout the FFT's math to ensure no loss of accuracy due to the bit growth.

Figure 7:
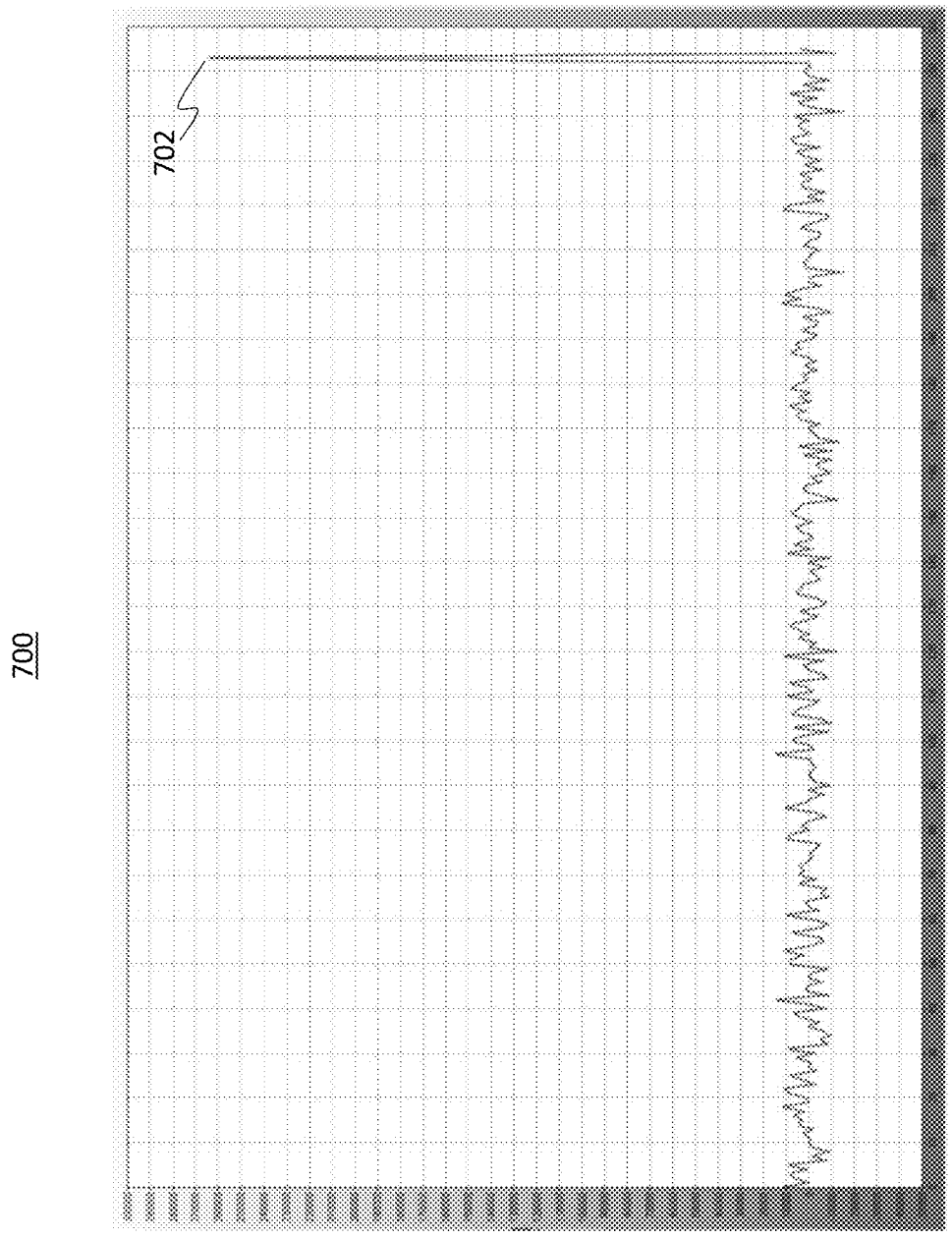
FIG. 7 shows a plot illustrating simulation results for an FFT output generated using the FFT reconstruction method described herein, for the input waveform as shown in FIG. 4, superimposed over results of an ideal FFT model for the same input waveform, according to some embodiments of the disclosure.

Note that even with such a high-level input as the one shown in FIG. 5, FFT results of applying the FFT algorithm are decent in that the peak 602 is clearly distinguishable. However, notable clipping occurred at the fundamental bin, as shown with the peak 602 being significantly less than the peak 604 of the ideal FFT, which is understandable because the non-idea FFT with the peak 602 saturated at the maximum value of 32K. Some clipping also occurred at other bins, but that is less pronounced in FIG. 6. In contrast, FIG. 7 shows a plot 700 illustrating reconstructed FFT output computed in accordance to an embodiment of the present disclosure where higher-gain and lower-gain FFTs were used (example #1 described above for the lower-gain, example #2 described above for the higher-gain), also superimposed over the ideal FFT model for the input waveform of FIG. 5. In this case, no noticeable mismatches are observed at all, the plot of the FFT output computed in accordance to an embodiment of the present disclosure looks substantially the same as the plot of the idea FFT, shown as a single plot with a peak 702.

Figure 8:
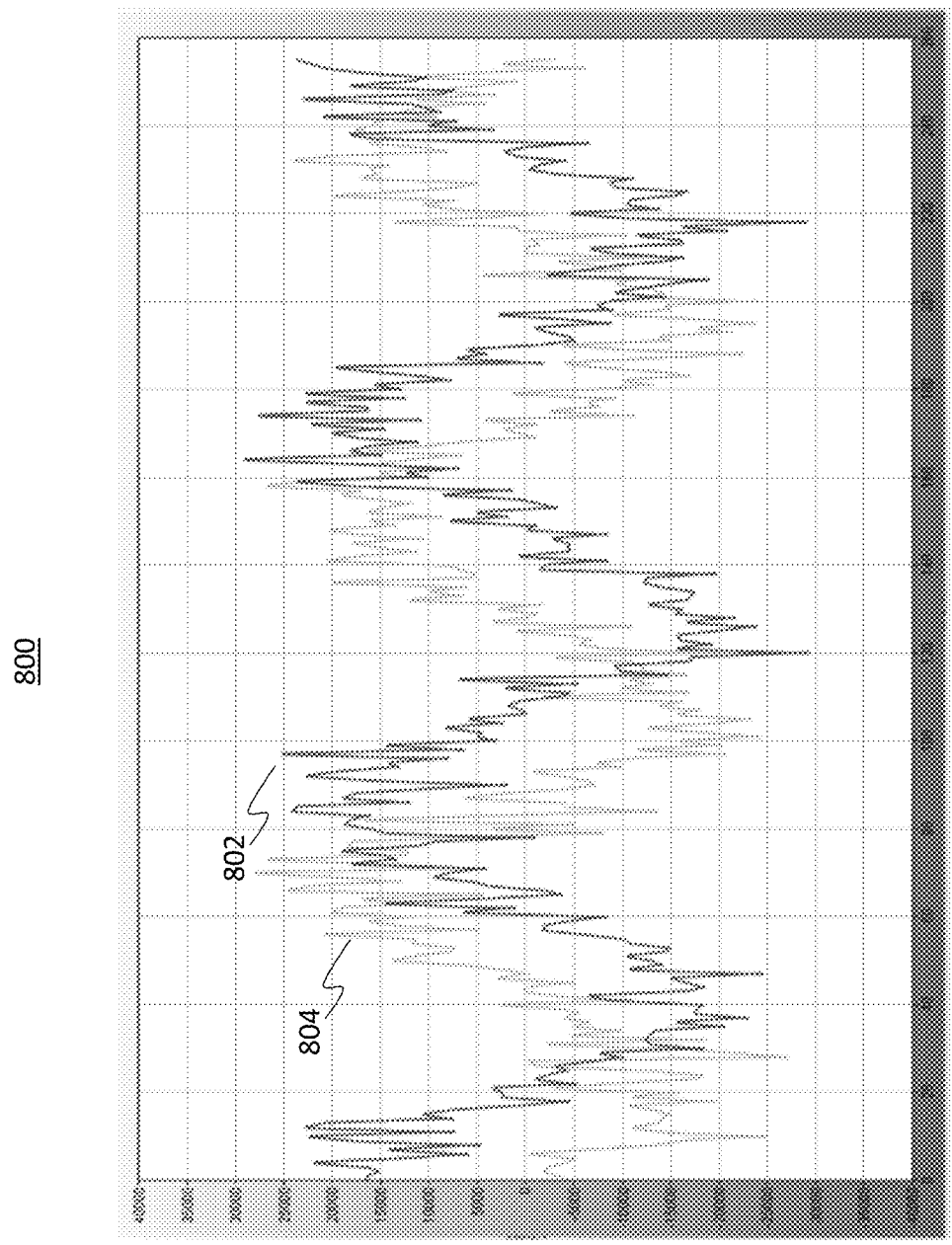
FIG. 8 shows a plot illustrating real and imaginary parts of an input signal as shown in FIG. 5, but having an amplitude that is 2 times greater than that of the input signal of FIG. 5, according to some embodiments of the disclosure.

FIG. 8 shows the same input signal as in FIG. 5, but doubled in amplitude. Note that the input signal of FIG. 8 is almost at its available full dynamic range. In FIG. 8, curve 802 represents the real part of such a noisy complex input waveform, while curve 804 represents the imaginary part.

Figure 9:
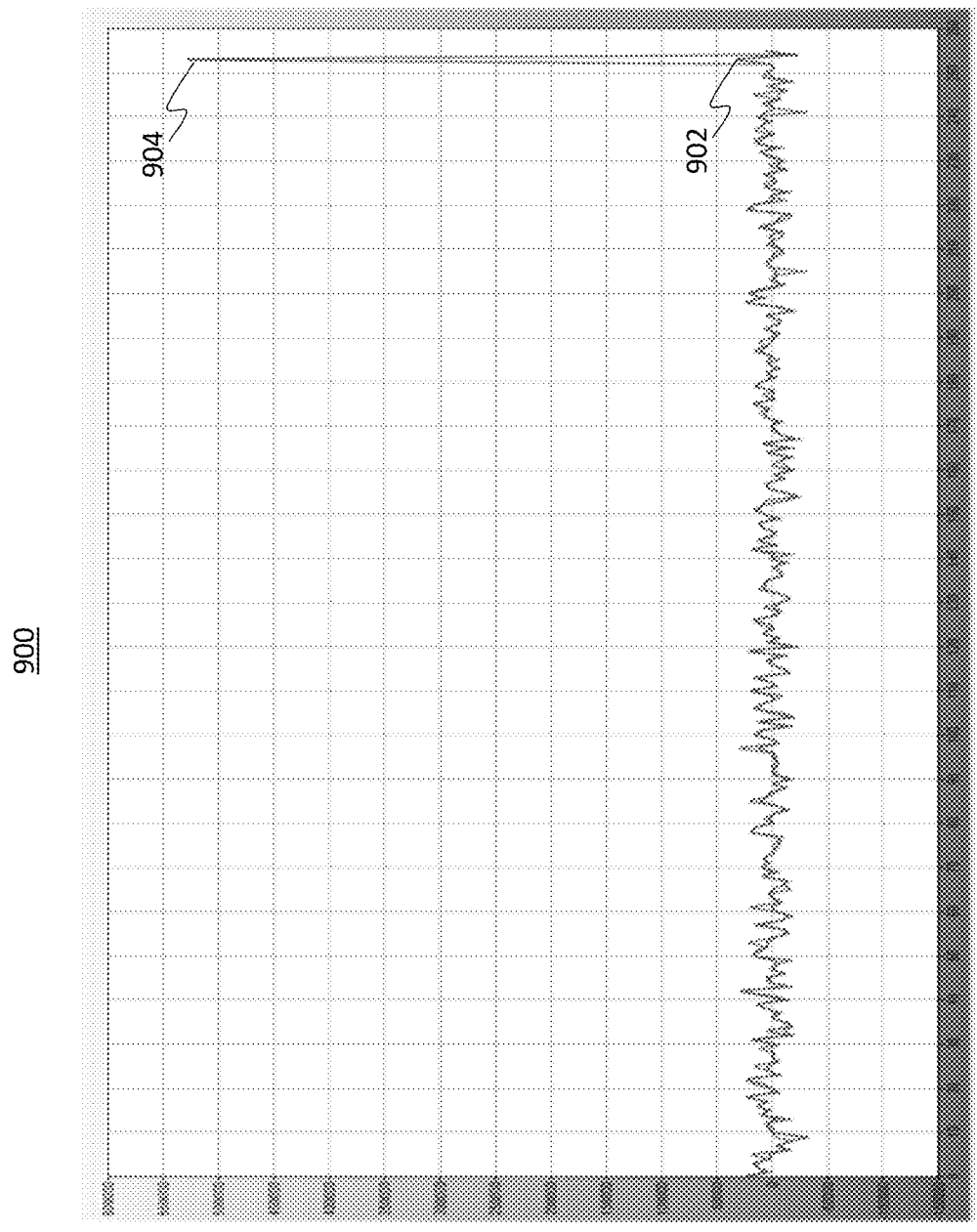
FIG. 9 shows a plot illustrating simulation results for a 256-point FFT of an input waveform as shown in FIG. 8, superimposed over results of an ideal FFT model for the same input waveform, according to some embodiments of the disclosure.

FIG. 9 shows a plot illustrating simulation results for a 256-point FFT of an input waveform as shown in FIG. 8 and implementing scaling by 0.5 bits for every radix-2 stage, shown as a curve with an FFT peak 902, superimposed over results of an ideal 32-bit FFT model for the same input waveform, shown as a curve with an FFT peak 904, according to some embodiments of the disclosure. There are clearly significant mismatches between the peaks 902 and 904, and, most importantly, even the peak of fundamental bin (i.e. peak 902) can no longer be distinguished as dominant from the rest of the peaks of lower amplitude shown in FIG. 9.

Figure 10:
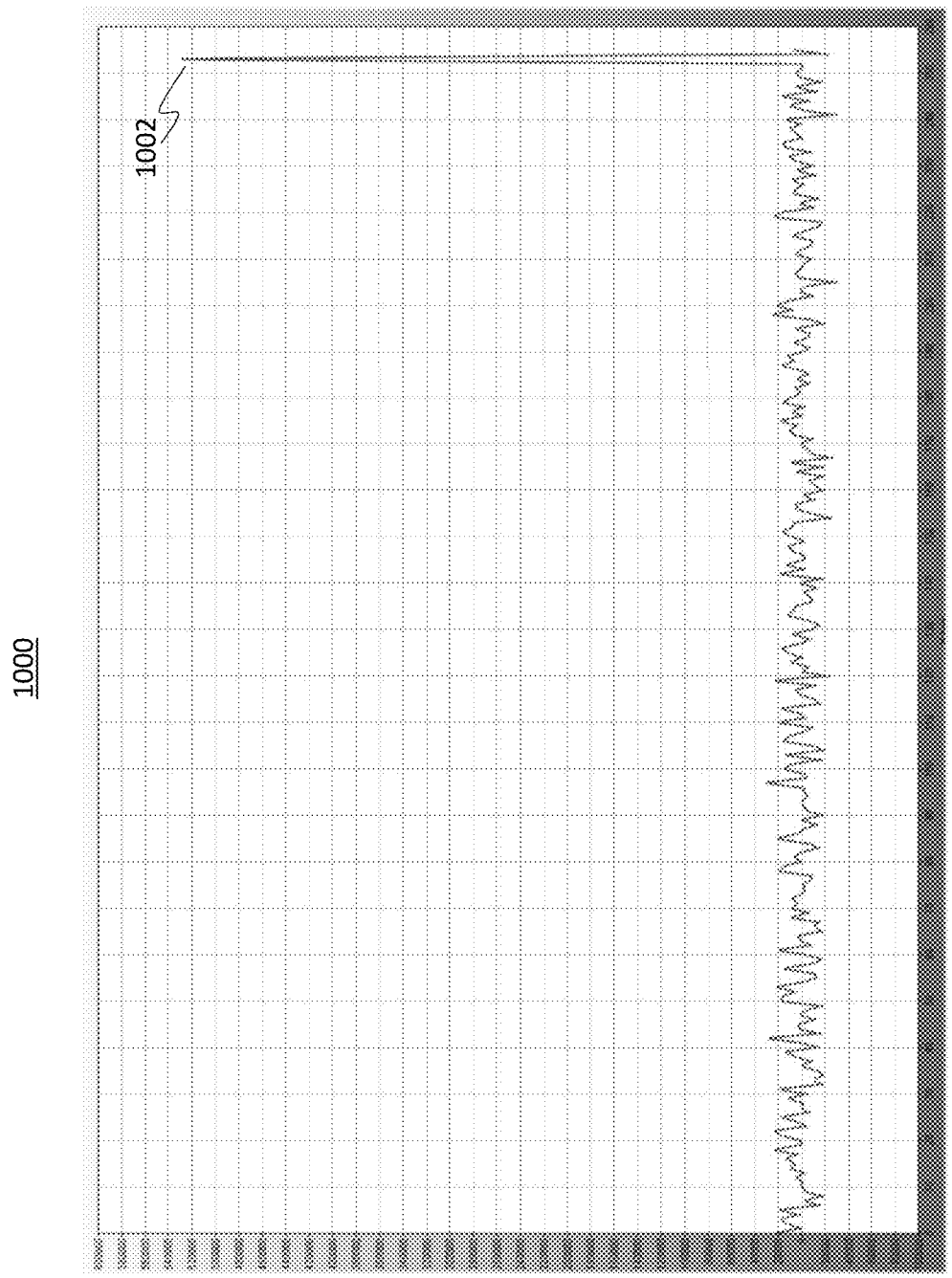
FIG. 10 shows a plot illustrating simulation results for an FFT output generated using the FFT reconstruction method described herein, for the input waveform as shown in FIG. 8, superimposed over results of an ideal FFT model for the same input waveform, according to some embodiments of the disclosure.

In contrast, FIG. 10 shows a plot similar to that of FIG. 7 but with the input signal of FIG. 8. Thus, FIG. 10 shows a plot 1000 illustrating a reconstructed FFT output computed in accordance to an embodiment of the present disclosure where higher-gain and lower-gain FFTs were used (example #1 described above for the lower-gain, example #2 described above for the higher-gain), also superimposed over the ideal FFT model for the input waveform of FIG. 8. Similar to FIG. 7, in this case of FIG. 10, no noticeable mismatches are observed at all, the plot of the FFT output computed in accordance to an embodiment of the present disclosure looks substantially the same as the plot of the idea FFT, shown as a single plot with a peak 1002.

One should note that the computation of the ideal FFT model (16-bit twiddles, 32-bit data) requires significantly more math operations than computation of the reconstructed FFT output according to the FFT reconstruction methods proposed herein. Every multiply for 16-bit twiddle, 32-bit data requires two 16-bit multiplies, with a shift and an addition at every FFT stage, while the improved FFT computation proposed herein performs its reconstruct only at the very end, once for each point. In some embodiments of radar/sonar applications, it is even possible to do all the range FFTs, then all the velocity FFTs, then magnitude, before applying the FFT output reconstruction as described herein.

Phase-Only FFTs

Explanations provided above are applicable to FFT algorithms where complex values or/and real values representing the magnitudes of different frequency components of the input signals, as computed by the FFT algorithms are analyzed, i.e. to FFTs that contain either complex values or real values representing magnitudes. Most of systems that require computation of FFTs use such FFT algorithms. However, some systems use only the phases of various frequency components of the input signals to make conclusions about the environment. For example, some acoustic source localization systems, i.e. systems that try to make conclusions about spatial positions of acoustic sources of interest, employ algorithms that don't need to have magnitudes or complex values of the FFTs but rather only use phases to determine where the acoustic sources are. Such algorithms are sometimes referred to as "phase transform", "PHAT" or "PHAT weighing" algorithms. Furthermore, some acoustic source separation systems, i.e. systems that try to make conclusions about individual contributions of various acoustic sources of interest to the total acoustic environment, also employ algorithms that only use phase information to perform source separation according to some blind source separation methods, such as e.g. the DUET algorithm where time-frequency bins are clustered according to which source they belong using phase as a localization cue.

Explanations provided above may be applicable to phase-only FFTs by slightly adapting the reconstruction techniques to account for the fact that scaling a complex value by a scalar does not change the phase of the complex number if the scalar is positive, and reverses the phase if the scalar is negative. This means that, when the FFT output values of the two or more FFT algorithms are real values representing the phases of the complex values computed by the algorithms (for a complex value x represented as a+ib, where a is the real part and b is the imaginary part of the complex value x, phase is calculated as an arctangent of b/a, i.e. phase=arctan (b/a)), then the test for whether or not a particular output value [n] of a higher-gain FFT algorithm was clipped is to simply compare the phase of that output value with the phase of the output value [n] of a lower-gain FFT algorithm that is assumed to not have been clipped. If the phases are equal, or are approximately equal such that their difference is within a certain predefined range, then that indicates that there was no clipping of the higher-gain FFT value and that value may be used as value [n] of the final FFT output. Otherwise, the value of the lower-gain FFT algorithm is used in the final FFT (i.e. this is the second difference with respect to the explanations provided above for complex values and real values representing magnitudes—if clipping of a higher-gain FFT was determined, then the final FFT will include the phase value of the lower-gain FFT, e.g. without scaling this value to account for differences in gains, e.g. without scaling by K/L as described above for some of the examples).

Considerations similar to those provided above with respect to selecting an appropriate range for making the determination whether clipping of a particular FFT value [n] has occurred are applicable here, and, therefore, in the interests of brevity, are not repeated.

Exemplary Method Utilizing the FFT Reconstruction Algorithm

Figure 11:
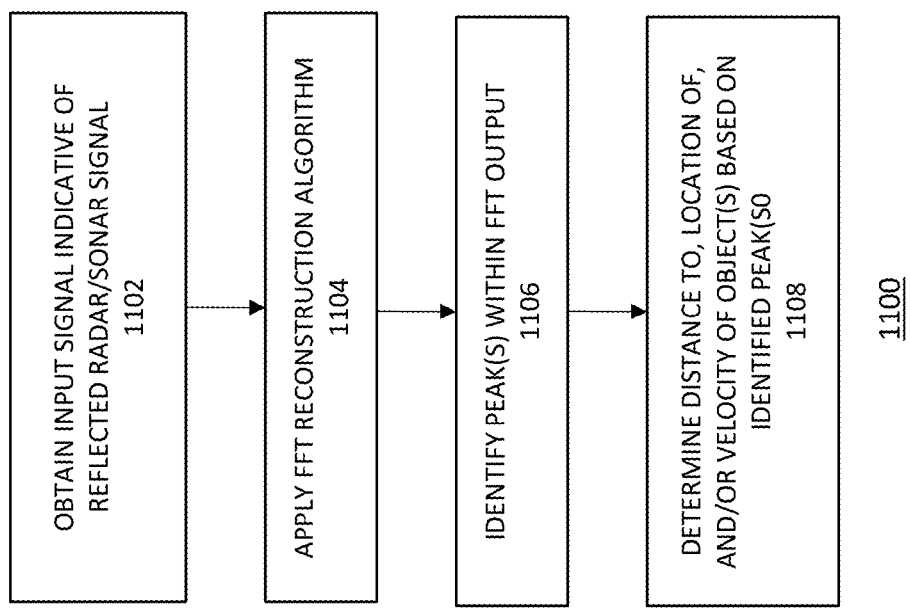
FIG. 11 illustrates an exemplary flow diagram of a method utilizing the FFT reconstruction algorithm, according to some embodiments of the disclosure.

FIG. 11 illustrates an exemplary flow diagram 1100 of a method utilizing the FFT reconstruction algorithms as described herein. Such a method may be performed by any data processing system comprising at least a processor and a memory, such as e.g. a data processing system 1200 illustrated in FIG. 12. Such a data processing system may be included within or communicatively connected to a radar or a sonar system, in particular a radar or a sonar receiver.

The method 1100 assumes that, first, a radar or a sonar transmitter transmits a signal that is to be reflected by one or more objects of interest and acquired by a radar or a sonar receiver. Such a signal is preferably a chirp signal.

The method 1100 may begin with the data processing system obtaining an input signal indicative of the signal detected by a radar antenna of a radar receiver or a sonar sensor of a sonar receiver (box 1102 in FIG. 11). The detected signal includes a signal transmitted by a radar or a sonar transmitter as reflected from one or more objects of interest. The transmitted signal could be a chirp signal, in which case the detected signal would also comprise a chirp signal. In various embodiments, the data processing system may receive the input signal from e.g. an analog front end of a radar or a sonar receiver configured to receive and possibly pre-process signals acquired by a radio or a sonar receiver. In some embodiments, the analog front end may convert (if desired) acquired analog signals to data samples of the input signal provided to the data processing system.

As illustrated with box 1104 in FIG. 11, the data processing system may then apply the FFT reconstruction method as described herein. To that end, the data processing system could e.g. perform steps as described above with reference to FIG. 4.

In some embodiments, FFT computations according to the first and second FFT algorithms described with reference to FIG. 4 could include performing horizontal (i.e. range) windowed FFTs on a data rectangle, preferably but not necessarily followed by the vertical (velocity) windowed FFTs. Thus, the data processing system may perform vertical FFTs on the results of the horizontal FFTs, before the peak identification of the following step starts. In implementations where only the range of the detected objects, and not their velocity, is of interest, the data processing system may be configured to carry out the peak identification on the output of the horizontal FFTs. In other words, in such implementations, the data processing system would only perform the horizontal FFTs on the input signal and arrange the results in a one-dimensional array indexing the frequencies, from which a distance to an object could be determined based on the frequency of the peak that was determined to be attributable to that object.

Once the data processing system obtains the output of applying the FFT reconstruction algorithm, the data processing system is configured to identify zero or more peaks that may be present within the reconstructed FFT output (box 1106 in FIG. 11). As previously described herein, ways to identify the peaks are known to a person of ordinary skill in the art and any of the known means and algorithms for identifying the peaks are within the scope of the present disclosure.

Based on the identified peak(s) in the reconstructed FFT output, the data processing system may determine, possibly for each object of interest, one or more of an indication of a distance to an object, an indication of a velocity of an object, an indication of a direction of movement of an object, and an indication of a location of an object, e.g. with respect to the radar/sonar receiver or a transmitter (box 1108 in FIG. 11). To that end, as described herein, the data processing system would determine x- and y-coordinates of the identified peaks to determine information regarding objects location and movement. Various ways to determine distances to, locations of, direction of movement, and/or velocities of objects based on the identified peaks in an FFT output of radar receivers are known in the art and are within the scope of the present disclosure.

As previously described herein, the FFT reconstruction methods proposed herein are not limited to radar and sonar applications. Consequently, a method similar to that shown in FIG. 11 is envisioned and is within the scope of the present disclosure, in which box 1102 would include obtaining an input signal indicative of any other received signal of interest, not necessarily radar or sonar, such as e.g. an input signal based on receiving an acoustic signal, and box 1108 would include determining other parameters of interest based on the reconstructed FFT output, such as e.g. noise filtering from the received acoustic signal or acoustic source separation (i.e. separation of contributions from the individual acoustic sources from the total received acoustic signal).

Exemplary Data Processing System

FIG. 12 depicts a block diagram illustrating an exemplary data processing system 1200, according to some embodiments of the present disclosure.

As shown in FIG. 12, the data processing system 1200 may include at least one processor 1202 coupled to memory elements 1204 through a system bus 1206. As such, the data processing system may store program code within memory elements 1204. Further, the processor 1202 may execute the program code accessed from the memory elements 1204 via a system bus 1206. In one aspect, the data processing system may be implemented as a computer that is suitable for storing and/or executing program code. It should be appreciated, however, that the data processing system 1200 may be implemented in the form of any system including a processor and a memory that is capable of performing the functions described within this disclosure.

The memory elements 1204 may include one or more physical memory devices such as, for example, local memory 1208 and one or more bulk storage devices 1210. The local memory may refer to random access memory or other non-persistent memory device(s) generally used during actual execution of the program code. A bulk storage device may be implemented as a hard drive or other persistent data storage device. The processing system 1200 may also include one or more cache memories (not shown) that provide temporary storage of at least some program code in order to reduce the number of times program code must be retrieved from the bulk storage device 1210 during execution.

Input/output (I/O) devices depicted as an input device 1212 and an output device 1214, optionally, can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 12 with a dashed line surrounding the input device 1212 and the output device 1214). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1216 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1200, and a data transmitter for transmitting data from the data processing system 1200 to said systems, devices and/or networks. Modems, cable modems, and Ethernet cards are examples of different types of network adapter that may be used with the data processing system 1200.

As pictured in FIG. 12, the memory elements 1204 may store an application 1218. In various embodiments, the application 1218 may be stored in the local memory 1208, the one or more bulk storage devices 1210, or apart from the local memory and the bulk storage devices. It should be appreciated that the data processing system 1200 may further execute an operating system (not shown in FIG. 12) that can facilitate execution of the application 1218. The application 1218, being implemented in the form of executable program code, can be executed by the data processing system 1200, e.g., by the processor 1202. Responsive to executing the application, the data processing system 1200 may be configured to perform one or more FFT reconstruction operations or method steps described herein.

Exemplary Radar or Sonar System Utilizing FFT Reconstruction

Figure 13:
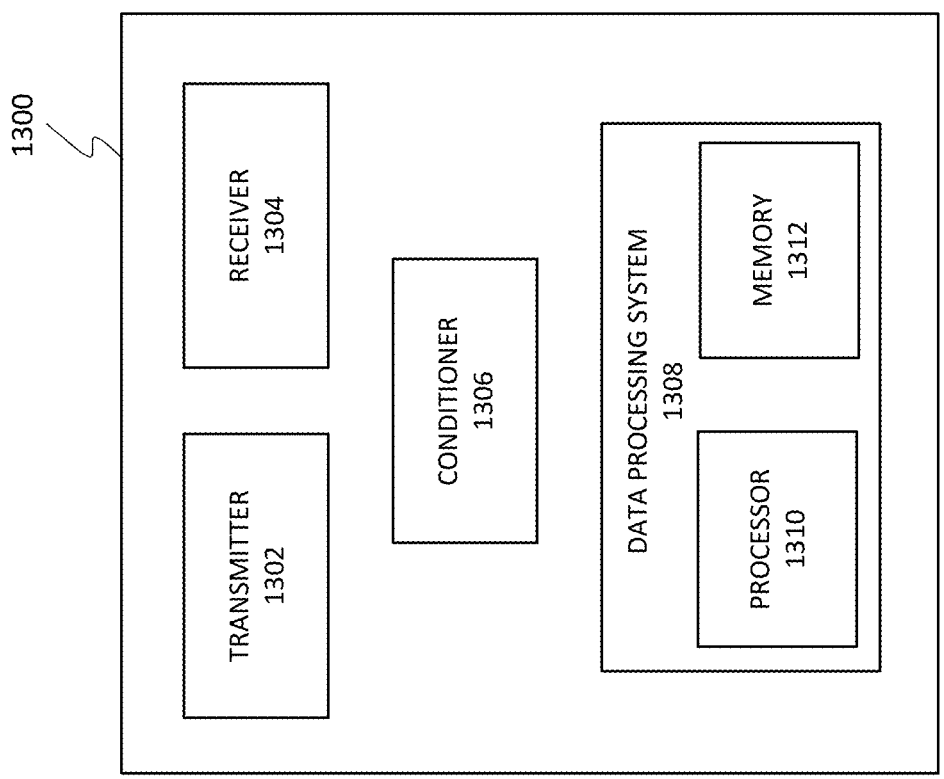
FIG. 13 illustrates a system view of an exemplary radio or sonar receiver configured to implement the FFT reconstruction algorithm, according to some embodiments of the disclosure.

FIG. 13 illustrates a system view of an exemplary system 1300 configured to implement the FFT reconstruction methods described herein, according to some embodiments of the disclosure. In some embodiments, the system 1300 may be a radio or a sonar system and, in such embodiments, the system 1300 may include a transmitter 1302 for transmitting signals to be reflected from objects, which would be a radar transmitter in case the system 1300 is a radar system and a sonar transmitter in case the system 1300 is a sonar system.

The transmitter 1302 may include a chirp signal generator. Various means for generating chirp signals are known in the art, such as e.g. using a YIG oscillator, employing analog circuit with a voltage-controlled oscillator (VCO) and linearly or exponentially ramping control voltage, or generating chirp signals digitally using a digital signal processor (DSP), a digital-to-analog converter (DAC), and a direct digital synthesizer (DDS) and by varying the step in the numerically controlled oscillator. All of the means and manners for generating a chirp signal are within the scope of the present disclosure.

The system 1300 further includes a sensor 1304 for detecting signals, e.g. one or more radio antennas in case the system 1300 is a radar system and one or more sonar sensors in case the system 1300 is a sonar system.

The system 1300 may also include a data processing system 1308 comprising at least a processor 1310 and a memory 1312 for carrying out FFT reconstruction methods and implementing various aspects of data processing functionality described herein. In some embodiments, the data processing system 1308 may be implemented as the system 1200 illustrated in FIG. 12.

In some embodiments, the data processing system 1308 may be configured to carry out the method 1100 illustrated in FIG. 11 as well as other processing features described herein, such as e.g. processing described in section "FFT basics and examples of using FFTs in radar and sonar applications" described above.

Optionally, the receiver may also include a signal conditioner 1306 configured to condition the signal as acquired by the receiver 1304 prior to supplying the conditioned signal as an input signal to the data processing system 1308. Such conditioning may include one or more of e.g. analog to digital conversion, filtering based on one or more predefined criteria (e.g. applying a passband filter to only process signals in a limited band of frequencies), amplification, etc.

Implementing the FFT reconstruction as described herein, enables implementing a high dynamic range system 1300 using fixed-point FFTs, advantageously decreasing cost and power consumption of the system.

While FIG. 13 illustrates the data processing system 1308 to be included within the system 1300, in other embodiments, the data processing system 1308 may be implemented external to the system 1300, in which case the data processing system 1308 may be configured to control the system 1300 remotely, via any appropriate communication channel. In other words, instead of being implemented within the system 1300 as shown in FIG. 13, the data processing system 1308 may be external to the system 1300 and be communicatively coupled to the system 1300.

EXAMPLES

Example 1 provides a computer-implemented method for generating a Fast Fourier Transform (FFT) of an input signal. The method includes applying a first multi-stage FFT algorithm to the input signal to generate a first FFT including N first values Output1[n] indexed with an index n, where the first FFT algorithm is configured to scale an output of one or more stages of the first FFT algorithm so that a gain of the first FFT algorithm is K; applying a second multi-stage FFT algorithm to the input signal to generate a second FFT including N second values Output2[n] indexed with the index n, where the second FFT algorithm is configured to scale an output of one or more stages of the second FFT algorithm so that a gain of the second FFT algorithm is L, where L is smaller than K; and generating the FFT including N FFT values Output[n] indexed with the index n by: for each index n, determining whether comparison of the first value Output1[n] and the second value Output2[n] satisfies a predefined condition, upon positive determination (i.e., when it is determined that the output value [n] of the first FFT is not clipped due to saturation), including the first value Output1[n] as the FFT value Output[n], and upon negative determination (i.e., when it is determined that the output value [n] of the first FFT was clipped due to saturation), including a value based on the second value Output2[n] as the FFT value Output[n].

Example 2 provides the method according to Example 1, where including the value based on the second value Output2[n] as the FFT value Output[n] includes including a value of K/L multiplied by the second value Output2[n] as the FFT value Output[n].

Example 3 provides the method according to Examples 1 or 2, where determining whether comparison of the first value Output1[n] and the second value Output2[n] satisfies the condition includes: multiplying the second value Output2[n] by K/L, subtracting, from a result of the multiplying, the first value Output1[n], and determining whether a result of the subtracting is within a predefined range including at least a value of zero.

Example 4 provides the method according to Example 3, where K/L is equal to $2^M$, where M is an integer, and where the multiplying includes applying a left shift of M bits to the second value Output2[n].

Example 5 provides the method according to Examples 1 or 2, where determining whether comparison of the first value Output1[n] and the second value Output2[n] satisfies the condition includes: dividing the first Output1[n] by the second value Output2[n], and determining whether a result of the dividing is within a predefined range including at least a value of K/L.

Example 6 provides the method according to Examples 1 or 2, where determining whether comparison of the first value Output1[n] and the second value Output2[n] satisfies the condition includes: computing a logarithm of the first value Output1[n], computing a logarithm of the second value Output2[n], subtracting the logarithm of the second value Output2[n] from the logarithm of the first value Output1[n], and determining whether a result of the subtracting is within a predefined range including at least a value of log(K/L).

Example 7 provides the method according to any one of the preceding Examples, where the N first values Output1[n], the N second values Output2[n], and the N FFT values Output[n] include real values indicative of a magnitude of each of one or more frequency contributions present within the input signal.

Example 8 provides the method according to any one of the preceding Examples, where the N first values Output1[n], the N second values Output2[n], and the N FFT values Output[n] include complex values indicative of a magnitude and a phase of each of one or more frequency contributions present within the input signal.

Example 9 provides the method according to Example 1, where including the value based on the second value Output2[n] as the FFT value Output[n] includes including the second value Output2[n] as the FFT value Output[n].

Example 10 provides the method according to Example 9, where determining whether comparison of the first value Output1[n] and the second value Output2[n] satisfies the condition includes determining whether the difference between the first value Output1[n] and the second value Output2[n] is within a predefined range including at least a value of zero.

Example 11 provides the method according to Examples 9 or 10, where the N first values Output1[n], the N second values Output2[n], and the N FFT values Output[n] include real values indicative of a phase of each of one or more frequency contributions present within the input signal.

Example 12 provides the method according to any one of the preceding Examples, where the first FFT algorithm is an FFT algorithm including two or more butterfly stages and where scaling the output of one or more stages of the first FFT algorithm includes scaling an output of every pair of butterfly stages by a scaling factor equal to two times of the inverse of a growth factor for the pair of butterfly stages for the first FFT algorithm for a complex exponential input signal.

Example 13 provides the method according to Example 12, where the first FFT algorithm includes a radix-2 algorithm and where scaling the output of every pair of butterfly stages by the scaling factor equal to two times of the inverse of the growth factor for the pair of butterfly stages for the first FFT algorithm for the complex exponential input signal includes scaling one butterfly stage of the every pair by a scaling factor of 1 and scaling another butterfly stage of the every pair of consecutive butterfly stages by a scaling factor of ½.

Example 14 provides the method according to Example 12, where the first FFT algorithm includes a radix-4 algorithm and where scaling the output of every pair of butterfly stages by the scaling factor equal to two times of the inverse of the growth factor for the pair of butterfly stages for the FFT algorithm for the complex exponential input signal includes scaling each butterfly stage by a scaling factor of ½.

Example 15 provides the method according to any one of Examples 1-14, where the second FFT algorithm is a radix-2 FFT algorithm including two or more butterfly stages and where scaling the output of one or more stages of the second FFT algorithm includes scaling each butterfly stage by a scaling factor of ½.

Example 16 provides the method according to any one of Examples 13-15, where scaling by the scaling factor of ½ includes applying a right shift of 1 bit to an outcome of the butterfly stage being scaled.

Example 17 provides the method according to any one of Examples 1-14, where the second FFT algorithm is a radix-4 FFT algorithm including two or more butterfly stages and where scaling the output of one or more stages of the second FFT algorithm includes scaling each butterfly stage by a scaling factor of ¼.

Example 18 provides the method according to Example 18, where scaling by the scaling factor of ¼ includes applying a right shift of 2 bits to an outcome of the butterfly stage being scaled.

Example 19 provides the method according to any one of the preceding Examples, where the input signal includes a substantially complex exponential signal or a substantially sinusoidal signal.

Example 20 provides the method according to any one of the preceding Examples, where: applying the first FFT algorithm includes applying a first horizontal windowed FFT algorithm on rows of data samples of the input signal and applying a first vertical windowed FFT algorithm on an output of the first horizontal windowed FFT algorithm to generate the N first values Output1[n], and/or applying the second FFT algorithm includes applying a second horizontal windowed FFT algorithm on rows of data samples of the input signal and applying a second vertical windowed FFT algorithm on an output of the second horizontal windowed FFT algorithm to generate the N second values Output2[n].

Example 21 provides the method according to any one of the preceding Examples, where each of the first FFT algorithm and the second FFT algorithm includes a fixed-point FFT algorithm.

Example 22 provides the method according to any one of the preceding Examples, where K is selected as a ratio of an input headroom to a square root of N, and/or L is selected as a ratio of the input headroom to N, where the input headroom is a difference between a number of bits provided for representing the output of each of the first FFT algorithm and the second FFT algorithms and a number of bits used for representing the input signal.

Example 23 provides the method according to any one of the preceding Examples, where the input signal is generated based on a radio signal reflected from an object, and where the method further includes determining one or more of an indication of a distance to the object, an indication of a velocity of the object, and an indication of a location of the object based on the N FFT values Output[n].

Example 24 provides a system for at least generating a Fast Fourier Transform (FFT) of an input signal, the system including a data processing system configured to implement a method according to any one of Examples 1-22.

Example 25 provides the system according to Example 24, where the data processing system is further configured to implement a method according to Example 23, and where the system further includes: a radar transmitter configured to transmit a radio signal; a radar receiver configured to detect a signal including at least a portion of the transmitted radio signal reflected from an object and to generate the input signal based on the detected signal.

Example 26 provides a non-transitory computer readable storage medium storing software code portions configured, when executed on a processor, to carry out the method according to any one of Examples 1-23.

Example 27 provides a computer program product comprising computer readable instructions for carrying out the method according to any one of Examples 1-23.

VARIATIONS AND IMPLEMENTATIONS

While embodiments of the present disclosure were described above with references to exemplary implementations as shown in FIGS. 2-13, a person skilled in the art will realize that the various teachings described above are applicable to a large variety of other implementations. In particular, while some descriptions provided in the present disclosure refer to radix-2 FFTs, these descriptions are applicable to other FFTs implemented with stages. Further, while examples provided herein are described with reference to an FFT comprising 6 stages and to a 16-bit integer FFT, of course in other implementations any other number of stages and any number of bits could be used.

In certain contexts, the features discussed herein can be applicable to automotive systems, safety-critical industrial applications, medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind).

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions.

In the discussions of the embodiments above, components of a system, such as e.g. clocks, multiplexers, buffers, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure related to virtual dithering.

Parts of various systems for implementing the FFT reconstruction functionality of fixed-point FFTs as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed signal domain. In some instances, the processor may be configured to carrying out the functions described herein by executing one or more instructions stored on a non-transitory computer readable storage medium.

In one example embodiment, any number of electrical circuits of FIGS. 4, 12 and 13 may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of FIGS. 4, 12 and 13 may be implemented as stand-alone modules (e.g., a device with associated components and circuitry configured to perform a specific application or function) or implemented as plug-in modules into application specific hardware of electronic devices. Note that particular embodiments of the present disclosure implementing the FFT reconstruction using multiple fixed-point FFTs may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the FFT reconstruction proposed herein may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of FIGS. 4, 12 and 13 may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of FIGS. 4, 12 and 13 and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to the FFT reconstruction as proposed herein illustrate only some of the possible functions that may be executed by, or within, system illustrated in FIGS. 4, 12 and 13. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Note that all optional features of the apparatus described above may also be implemented with respect to the method or process described herein and specifics in the examples may be used anywhere in one or more embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Although the claims are presented in single dependency format in the style used before the USPTO, it should be understood that any claim can depend on and be combined with any preceding claim of the same type unless that is clearly technically infeasible.

What is claimed is:

1. A computer-implemented method for determining one or more of an indication of a distance to the object, an indication of a velocity of the object, and an indication of a location of the object based on a Fast Fourier Transform (FFT) of an input signal, the method comprising:

applying to the input signal a first FFT algorithm having a gain K to generate a first FFT comprising N first values Output1[n] indexed with an index n, wherein the input signal is generated based on a signal reflected from an object;
applying to the input signal a second FFT algorithm having a gain L, smaller than K, to generate a second FFT comprising N second values Output2[n] indexed with the index n;
generating the FFT comprising N FFT values Output[n] indexed with the index n; and
determining one or more of the indication of the distance to the object, the indication of the velocity of the object, and the indication of the location of the object based on the FFT values Output[n],
wherein generating the FFT values Output[n] comprises:
for each index n, determining whether comparison of the first value Output1[n] and the second value Output2[n] satisfies a condition,
upon positive determination, including the first value Output1[n] as the FFT value Output[n], and
upon negative determination, including a value based on the second value Output2[n] as the FFT value Output[n].

2. The method according to claim 1, wherein including the value based on the second value Output2[n] as the FFT value Output[n] comprises including a value of K/L multiplied by the second value Output2[n] as the FFT value Output[n].

3. The method according to claim 1, wherein determining whether comparison of the first value Output1[n] and the second value Output2[n] satisfies the condition comprises:
multiplying the second value Output2[n] by K/L,
subtracting, from a result of the multiplying, the first value Output1[n], and
determining whether a result of the subtracting is within a range comprising at least a value of zero.

4. The method according to claim 3, wherein K/L is equal to $2^M$, where M is an integer, and wherein the multiplying comprises applying a left shift of M bits to the second value Output2[n].

5. The method according to claim 1, wherein:
the N first values Output1[n], the N second values Output2[n], and the N FFT values Output[n] comprise real values indicative of a magnitude of each of one or more frequency contributions present within the input signal.

6. The method according to claim 1, wherein:
the N first values Output1[n], the N second values Output2[n], and the N FFT values Output[n] comprise complex values indicative of a magnitude and a phase of each of one or more frequency contributions present within the input signal.

7. The method according to claim 1, wherein including the value based on the second value Output2[n] as the FFT value Output[n] comprises including the second value Output2[n] as the FFT value Output[n].

8. The method according to claim 7, wherein determining whether comparison of the first value Output1[n] and the second value Output2[n] satisfies the condition comprises determining whether the difference between the first value Output1[n] and the second value Output1[n] is within a range comprising at least a value of zero.

9. The method according to claim 7, wherein:
the N first values Output1[n], the N second values Output1[n], and the N FFT values Output[n] comprise real values indicative of a phase of each of one or more frequency contributions present within the input signal.

10. The method according to claim 1, wherein:
the first FFT algorithm is a radix-2 algorithm operating on one or more pairs of consecutive butterfly stages, and
the first FFT algorithm is configured to scale an output of the one or more pairs of consecutive butterfly stages by
scaling an output of a first butterfly stage of at least a first pair of the one or more pairs of consecutive butterfly stages by a scaling factor of 1 and
scaling an output of a second butterfly stage of at least the first pair of the one or more pairs of consecutive butterfly stages by a scaling factor of ½.

11. The method according to claim 1, wherein:
the first FFT algorithm is a radix-4 algorithm operating on a plurality of butterfly stages, and
the first FFT algorithm is configured to scale an output of the plurality of butterfly stages by scaling each butterfly stage by a scaling factor of ½.

12. The method according to claim 1, wherein the second FFT algorithm is a radix-2 FFT algorithm comprising two or more butterfly stages and wherein the second FFT algorithm is configured to scale an output of one or more stages of the second FFT algorithm by applying a right shift of 1 bit to an outcome of the butterfly stage being scaled.

13. The method according to claim 1, wherein the second FFT algorithm is a radix-4 FFT algorithm comprising two or more butterfly stages and wherein the second FFT algorithm is configured to scale an output of one or more stages of the second FFT algorithm by applying a right shift of 2 bits to an outcome of the butterfly stage being scaled.

14. The method according to claim 1, wherein:
applying the first FFT algorithm comprises applying a first horizontal windowed FFT algorithm on rows of data samples of the input signal and applying a first vertical windowed FFT algorithm on an output of the first horizontal windowed FFT algorithm, and/or
applying the second FFT algorithm comprises applying a second horizontal windowed FFT algorithm on rows of data samples of the input signal and applying a second vertical windowed FFT algorithm on an output of the second horizontal windowed FFT algorithm.

15. The method according to claim 1, wherein K is selected as a ratio of an input headroom to a square root of N, and/or L is selected as a ratio of the input headroom to N, wherein the input headroom is a difference between a number of bits provided for representing the output of each of the first FFT algorithm and the second FFT algorithms and a number of bits used for representing the input signal.

16. The method according to claim 1, wherein the condition is a condition indicating that clipping did not occur.

17. A system for determining one or more of an indication of a distance to the object, an indication of a velocity of the object, and an indication of a location of the object, the system comprising:
a receiver configured to receive a signal reflected from the object; and
a data processing system configured to:
apply to an input signal a first FFT algorithm having a gain K to generate a first FFT, wherein the input signal is generated based on the signal reflected from the object,
apply to the input signal a second FFT algorithm having a gain L, smaller than K, to generate a second FFT,
generate an FFT of the input signal based on the first FFT and the second FFT, and
determine one or more of the indication of the distance to the object, the indication of the velocity of the object, and the indication of the location of the object based on the FFT of the input signal.

18. The system according to claim 17, wherein:
the first FFT comprises N first values Output1[n] indexed with an index n,
the second FFT comprises N second values Output2[n] indexed with the index n, and
generating the FFT values Output[n] comprises:
for each index n, determining whether comparison of the first value Output1[n] and the second value Output2[n] satisfies a condition,
upon positive determination, including the first value Output1[n] as the FFT value Output[n], and
upon negative determination, including a value based on the second value Output2[n] as the FFT value Output[n].

19. The system according to claim 18, wherein including the value based on the second value Output2[n] as the FFT value Output[n] comprises including a value of K/L multiplied by the second value Output2[n] as the FFT value Output[n].

20. The system according to claim 17, wherein each of the first FFT algorithm and the second FFT algorithm is a fixed-point FFT algorithm.

21. The system according to claim 17, wherein the first FFT algorithm is an FFT algorithm comprising two or more butterfly stages and wherein the first FFT algorithm is configured to scale an output of one or more stages of the first FFT algorithm by scaling an output of every pair of butterfly stages by a scaling factor equal to two times of the inverse of a growth factor for the pair of butterfly stages for the first FFT algorithm for a complex exponential input signal.

22. The system according to claim 17, wherein the second FFT algorithm is a radix-2 FFT algorithm comprising two or more butterfly stages and wherein the second FFT algorithm is configured to scale an output of one or more stages of the second FFT algorithm by scaling each butterfly stage by a scaling factor of ½.

23. The system according to claim 17, wherein the second FFT algorithm is a radix-4 FFT algorithm comprising two or more butterfly stages and wherein the second FFT algorithm is configured to scale an output of one or more stages of the second FFT algorithm by scaling each butterfly stage by a scaling factor of ¼.

24. The system according to claim 17, wherein:
the signal reflected from the object is a radio signal and the receiver is a radar receiver, or
the signal reflected from the object is an acoustic signal and the receiver is a sonar receiver.

25. The system according to claim 17, wherein values of the first FFT, the second FFT, and the FFT of the input signal include real values indicative of magnitudes of one or more frequency contributions present within the input signal.

26. The system according to claim 17, wherein values of the first FFT, the second FFT, and the FFT of the input signal include complex values indicative of magnitudes and phases of one or more frequency contributions present within the input signal.

27. The system according to claim 17, wherein the system is:
a telecommunications system,
an audio source localization and/or separation system,
an automotive system, or
an aviation system.

28. A system for extracting a baseband signal of interest based on a signal received by a receiver, the system comprising:

a receiver configured to receive the signal, wherein the signal is an electromagnetic or an acoustic signal, and to convert the signal to an electrical signal provided as an input signal to the data processing system; and
a data processing system configured to:
apply to the input signal a first FFT algorithm having a gain K to generate a first FFT,
apply to the input signal a second FFT algorithm having a gain L, smaller than K, to generate a second FFT,
generate a reconstructed FFT of the input signal based on the first FFT and the second FFT, and
extract the baseband signal of interest based on the reconstructed FFT.

29. The system according to claim 28, wherein:
the first FFT comprises N first values Output1[n] indexed with an index n,
the second FFT comprises N second values Output2[n] indexed with the index n, and
generating the FFT values Output[n] comprises:
for each index n, determining whether comparison of the first value Output1[n] and the second value Output2[n] satisfies a condition,
upon positive determination, including the first value Output1[n] as the FFT value Output[n], and
upon negative determination, including a value based on the second value Output2[n] as the FFT value Output[n].

30. The system according to claim 29, wherein including the value based on the second value Output2[n] as the FFT value Output[n] comprises including a value of K/L multiplied by the second value Output2[n] as the FFT value Output[n].

31. The system according to claim 28, wherein each of the first FFT algorithm and the second FFT algorithm is a fixed-point FFT algorithm.

32. The system according to claim 28, wherein the system is:
a telecommunications system,
an audio source localization system,
an audio source separation system,
an automotive system, or
an aviation system.

33. A system for determining one or more of an indication of a distance to the object, an indication of a velocity of the object, and an indication of a location of the object based on a Fast Fourier Transform (FFT) of an input signal, the system comprising:
means for applying to the input signal a first FFT algorithm having a gain K to generate a first FFT comprising N first values Output1[n] indexed with an index n, wherein the input signal is generated based on a signal reflected from an object;
means for applying to the input signal a second FFT algorithm having a gain L, smaller than K, to generate a second FFT comprising N second values Output2[n] indexed with the index n;
means for generating the FFT comprising N FFT values Output[n] indexed with the index n; and
means for determining one or more of the indication of the distance to the object, the indication of the velocity of the object, and the indication of the location of the object based on the FFT values Output[n],
wherein generating the FFT values Output[n] comprises:
for each index n, determining whether comparison of the first value Output1[n] and the second value Output2[n] satisfies a condition, upon positive determination, including the first value Output1[n] as the FFT value Output[n], and upon negative determination, including a value based on the second value Output2[n] as the FFT value Output[n].

34. The system according to claim 33, wherein the first FFT algorithm is an FFT algorithm comprising two or more butterfly stages and wherein the first FFT algorithm is configured to scale an output of one or more stages of the first FFT algorithm by scaling an output of every pair of butterfly stages by a scaling factor equal to two times of the inverse of a growth factor for the pair of butterfly stages for the first FFT algorithm for a complex exponential input signal.

35. The system according to claim 33, wherein the second FFT algorithm is a radix-2 FFT algorithm comprising two or more butterfly stages and wherein the second FFT algorithm is configured to scale an output of one or more stages of the second FFT algorithm by scaling each butterfly stage by a scaling factor of ½.

36. The system according to claim 33, wherein the second FFT algorithm is a radix-4 FFT algorithm comprising two or more butterfly stages and wherein the second FFT algorithm is configured to scale an output of one or more stages of the second FFT algorithm by scaling each butterfly stage by a scaling factor of ¼.

37. The system according to claim 33, wherein each of the first FFT algorithm and the second FFT algorithm comprises a fixed-point FFT algorithm.

38. The system according to claim 33, wherein the first FFT algorithm is configured to scale an output of one or more stages of the first FFT algorithm so that the gain of the first FFT algorithm is K and the second FFT algorithm is configured to scale an output of one or more stages of the second FFT algorithm so that the gain of the second FFT algorithm is L.

39. A system for extracting a baseband signal of interest based on an input signal indicative of a signal received by a receiver, the system comprising:

means for applying to the input signal a first FFT algorithm having a gain K to generate a first FFT;

means for applying to the input signal a second FFT algorithm having a gain L, smaller than K, to generate a second FFT;

means for generating a reconstructed FFT of the input signal based on the first FFT and the second FFT; and means for extracting the baseband signal of interest based on the reconstructed FFT, wherein the signal received by the receiver is an electromagnetic or an acoustic signal, and the input signal is an electrical signal generated by converting the signal received by the receiver.

40. The system according to claim 39, wherein:

the first FFT comprises N first values Output1[n] indexed with an index n, the second FFT comprises N second values Output2[n] indexed with the index n, and generating the FFT values Output[n] comprises:

for each index n, determining whether comparison of the first value Output1[n] and the second value Output2[n] satisfies a condition, upon positive determination, including the first value Output1[n] as the FFT value Output[n], and upon negative determination, including a value based on the second value Output2[n] as the FFT value Output[n].

41. The system according to claim 40, wherein including the value based on the second value Output2[n] as the FFT value Output[n] comprises including a value of K/L multiplied by the second value Output2[n] as the FFT value Output[n].

42. The system according to claim 39, wherein each of the first FFT algorithm and the second FFT algorithm is a fixed-point FFT algorithm.

* * * * *